United States Patent
Coogan et al.

(10) Patent No.: US 11,174,398 B2
(45) Date of Patent: Nov. 16, 2021

(54) OVERHEAD CONDUCTOR WITH SELF-CLEANING COATING

(71) Applicant: CABLE COATINGS LIMITED, Leeds (GB)

(72) Inventors: Niall Coogan, Stockport (GB); Barry Johnston, Chester (GB)

(73) Assignee: CABLE COATINGS LIMITED, Leeds (GB)

( * ) Notice: Subject to any disclaimer, the term of this patent is extended or adjusted under 35 U.S.C. 154(b) by 0 days.

(21) Appl. No.: 17/274,957

(22) PCT Filed: Sep. 6, 2019

(86) PCT No.: PCT/GB2019/052498
§ 371 (c)(1),
(2) Date: Mar. 10, 2021

(87) PCT Pub. No.: WO2020/053559
PCT Pub. Date: Mar. 19, 2020

(65) Prior Publication Data
US 2021/0246320 A1    Aug. 12, 2021

(30) Foreign Application Priority Data
Sep. 10, 2018    (GB) .................................... 1814691

(51) Int. Cl.
*C09D 7/61*    (2018.01)
*H01B 3/02*    (2006.01)
(Continued)

(52) U.S. Cl.
CPC ............. *C09D 7/61* (2018.01); *C09D 1/04* (2013.01); *C09D 7/67* (2018.01); *C09D 101/284* (2013.01);
(Continued)

(58) Field of Classification Search
CPC .......... H01B 3/10; H01B 7/421; H01B 9/008; C09D 7/67
See application file for complete search history.

(56) References Cited

U.S. PATENT DOCUMENTS 9,595,368 B2    3/2017    Ranganathan et al.
9,859,038 B2 *  1/2018    Davis ....................... H01B 7/29
(Continued)

FOREIGN PATENT DOCUMENTS

FR    2971617 A1    8/2012
JP    2018002964 A   1/2018
(Continued)

OTHER PUBLICATIONS

International Preliminary Report on Patentability for the corresponding International Application No. PCT/GB2019/052498; International Filing Date: Sep. 6, 2019; dated Sep. 16, 2020; 7 pages.
(Continued)

*Primary Examiner* — Michael A Salvitti
(74) *Attorney, Agent, or Firm* — Cantor Colburn LLP

(57) ABSTRACT

A single coated conductor for an overhead power transmission or distribution line is provided comprising one or more electrical conductors (400) and a first coating (401) provided on at least a portion of the one or more electrical conductors (400). The first coating (401) comprises: (i) an inorganic binder comprising an alkali metal silicate; (ii) a polymerisation agent comprising nanosilica ("nS") or colloidal silica ($SiO_2$); and (iii) a photocatalytic agent, wherein the photocatalytic agent comprises ≥70 wt % anatase titanium dioxide ($TiO_2$) having an average particle size ("aps") ≤100 nm. The first coating (401) has an average thermal emissivity coefficient E≥0.90 across the infrared spectrum 2.5-30.0 μm and
(Continued)

has an average solar reflectivity coefficient R≥0.90 and/or an average solar absorptivity coefficient A≤0.10 across the solar spectrum 0.3-2.5 μm.

23 Claims, 8 Drawing Sheets

(51) Int. Cl.
| | |
|---|---|
| H01B 7/02 | (2006.01) |
| H01B 13/16 | (2006.01) |
| C09D 1/04 | (2006.01) |
| C09D 101/28 | (2006.01) |
| C09D 183/04 | (2006.01) |
| C09D 7/40 | (2018.01) |
| C08K 3/36 | (2006.01) |
| C08K 3/22 | (2006.01) |

(52) U.S. Cl.
CPC .............. *C09D 183/04* (2013.01); *H01B 3/02* (2013.01); *H01B 7/02* (2013.01); *H01B 13/165* (2013.01); *C08K 3/36* (2013.01); *C08K 2003/2241* (2013.01)

(56) References Cited

U.S. PATENT DOCUMENTS

| | | | |
|---|---|---|---|
| 10,514,215 B2* | 12/2019 | Han | ..................... F24S 70/225 |
| 2005/0266981 A1 | 12/2005 | Nakajima et al. | |
| 2008/0261007 A1 | 10/2008 | Hong et al. | |
| 2010/0240526 A1* | 9/2010 | Hong | ................... C01G 23/047 502/84 |
| 2014/0041925 A1* | 2/2014 | Davis | ..................... H01B 13/30 174/40 R |
| 2015/0104641 A1* | 4/2015 | Mhetar | .................. H01B 1/026 428/366 |
| 2015/0194237 A1* | 7/2015 | Ranganathan | ......... H01B 5/002 174/40 R |
| 2015/0353737 A1 | 12/2015 | Siripurapu et al. | |
| 2016/0032107 A1 | 2/2016 | Siripurapu et al. | |
| 2018/0025809 A1 | 1/2018 | Ranganathan et al. | |
| 2019/0056184 A1* | 2/2019 | Han | ..................... F25B 23/003 |
| 2020/0263940 A1* | 8/2020 | Han | ...................... F28F 13/185 |

FOREIGN PATENT DOCUMENTS

| | | | |
|---|---|---|---|
| WO | 2007034248 A1 | 3/2007 | |
| WO | 2014025420 A1 | 2/2014 | |
| WO | 2015105972 A1 | 7/2015 | |
| WO | WO 2020/053559 | * 3/2020 | ............... H01B 3/02 |

OTHER PUBLICATIONS

International Search Report for the corresponding International Application No. PCT/GB2019/052498; International Filing Date: Sep. 6, 2019, dated Dec. 6, 2019; 4 pages.
Written Opinion for the corresponding International Application No. PCT/GB2019/052498; International Filing Date: Sep. 6, 2019, dated Dec. 6, 2019; 5 pages.

* cited by examiner

OVERHEAD CONDUCTOR WITH SELF-CLEANING COATING

CROSS-REFERENCE TO RELATED APPLICATIONS

This application is a National Stage application of PCT/GB2019/052498, filed Sep. 6, 2019, which claims benefit of Application No. GB1814691.0 filed on Sep. 10, 2018, both of which are incorporated by reference herein in their entirety.

FIELD OF THE PRESENT INVENTION

The present invention relates to electric overhead conductors. Various preferred embodiments relate to high voltage electric overhead conductors which have a single coating for the purpose of reducing the temperature of the conductor thereby reducing the resistance of the conductor (as electrical resistance is temperature dependent) and hence reducing power losses in the conductor (since power loss is dependent upon electrical resistance). The single coated high voltage electric overhead conductor includes a photo-catalytic self-cleaning agent.

BACKGROUND

Various different types of high voltage electric overhead conductors are known comprising aluminium cables suspended between pylons. The various different types of known high voltage electric overhead conductors can be divided into two groups. The first group comprises conductors which have a maximum operating temperature of 80° C.

The second group comprises conductors which have a higher maximum operating temperature in the range 150-250° C.

There are various particular problems associated with high voltage electric overhead conductors and these problems can become particularly acute with high voltage electric overhead conductors which are operable at elevated operating temperatures in the range 150-250° C. Such conductors may, for example, be installed in particularly hot regions of the world such as Southern USA, the Middle East and Australia.

High voltage electric overhead conductors which are installed in particularly hot regions of the world suffer from the problem that the overhead conductors are exposed to significant solar heating due to intense sunlight for a majority of the year. An overhead electric conductor which is subjected to sustained solar radiation throughout the year presents a number of significant operational challenges to a utility company seeking to manage an overhead power transmission or distribution line or network.

As will be understood by those skilled in the art, the temperature of a high voltage electric overhead conductor will tend to increase due to two main factors. The first factor is that there will be Ohmic losses due to the transmission of electric current through the conductor which will result in Joule heating of the conductor. The second factor is that the conductor will be subjected to relatively intense solar radiation (i.e. sunlight) and hence will be heated by solar radiation. It will be apparent that both factors will play a role in elevating the temperature of the conductor.

It will also be understood that there are also a number of other potential factors which will tend to decrease the temperature of the conductor. For example, a conductor may lose energy by emitting infra-red (heat) radiation. A conductor may also lose energy by conduction or by convection (e.g. due to air currents, wind etc.). However, as a practical matter, energy losses due to conduction are fairly minimal and energy losses due to convection depend upon the geographic location where the conductor is installed.

It will be understood by those skilled in the art that the predominant cooling mechanism by which an overhead electric conductor will lose energy is via radiation i.e. by radiating heat energy and in particular infra-red radiation in the infrared wavelength range 2.5-30.0 μm.

Accordingly, to a first approximation the temperature of a high voltage overhead electric conductor will increase due to the combined effects of Joule heating and solar radiation with this temperature increase being offset by energy loss due to the conductor emitting infra-red radiation.

For illustrative purposes, a bare overhead aluminium electric conductor may be considered having an average solar absorptivity coefficient A of 0.5 across the solar spectrum 0.3-2.5 μm. It will be understood that the bare aluminium conductor will have a corresponding average solar reflectivity coefficient R of 0.5. Accordingly, a bare aluminium electric conductor exposed to solar radiation (i.e. sunshine) will absorb approx. 50% of the incident solar radiation.

The net effect of the conductor absorbing approx. 50% of incident solar radiation over a sustained period of time coupled with significant Joule heating of the conductor will cause the temperature of the overhead conductor to rise up to a maximum rated operating temperature. Dependent upon the geographic location of the conductor energy losses due to air currents (i.e. wind) may be low or negligible. The maximum operating temperature of the conductor may be either 80° C. or in the range 150-250° C.

Once an overhead conductors reaches or approaches its maximum rated operating temperature then the utility company managing the power transmission or distribution line or network is required to reduce the transmitted current through the conductor so as to reduce the effects of Joule heating thereby maintaining the overhead conductor within a safe operating temperature range.

Various different types of conductors are known and will now be described in more detail below.

All Aluminium Conductors ("AAC") comprise hard drawn aluminium wires stranded in successive layers in opposite directions to form the conductor as per BS EN 50182 or IEC 61089. AAC conductors may be used for aerial distribution lines having relatively short spans, aerial feeders and bus bars of substations. AAC conductors have a high corrosion resistance since steel is not present. Conventional AAC conductors are typically rated up to a maximum operating temperature of 80° C.

All Aluminium Alloy Conductors ("AAAC") comprise All Aluminium Alloy ("ALMELEC") wires stranded in successive layers in opposite directions to form the conductor as per IEC 61089, BS EN 50182 or ASTM B 399. AAAC conductors are mainly used for overhead lines in transmission and distribution electrical networks having relatively long spans. They are also used as a messenger to support overhead electrical cables. AAAC conductors have a high corrosion resistance since steel is not present. Conventional AAAC conductors are typically rated up to a maximum operating temperature of 80° C.

Aluminium Conductor Steel Reinforced ("ACSR") conductors comprise an outer layer of aluminium conductor concentrically stranded over a central core of galvanized or stranded steel wires to form the conductor as per BS EN 50182, ASTM B 232 or IEC 61089. ACSR conductors are widely used for electrical power transmission over long distances. ACSR conductors may also be used as a messenger for supporting overhead electrical cables. Conventional ACSR conductors are typically rated up to a maximum operating temperature of 80° C.

Aluminium Conductor Aluminium Clad Steel Reinforced ("ACSR/AW") conductors comprise an outer layer of aluminium conductor concentrically stranded over a central core of aluminium clad steel solid or stranded cable to form the conductor as per ASTM B 549. ACSR/AW conductors are used for electrical power transmission and are ideal for long overhead lines spans like ACSR conductors but with slightly better resistance and current carrying capacity in addition to good corrosion resistance. Conventional ACSR/AW conductors are typically rated up to a maximum operating temperature of 80° C.

Areal Bundled Cables ("ABC") are made from aluminium conductors which are insulated by XLPE insulation and assembled to form two (Duplex), three (Triplex), four (Quadruplex) or more conductors as per ICEA S 474-76 or BS EN 50182. They are used for secondary overhead lines (in circuits not exceeding 600 V phase to phase) on poles or as feeders to residential premises.

Various High Temperature Low Sag ("HTLS") conductors are also known which are designed to operate at significantly higher operational temperatures of up to 150-250° C.

Known HTLS conductors include Aluminium Conductor Composite Core ("ACCC") conductors, Aluminium Conductor Steel Supported ("ACSS/MA") conductors, Aluminium Conductor Aluminium Clad Steel Supported ("ACSS/AW") conductors, Thermal Resistant Aluminium Alloy Conductor Steel Reinforced ("TACSR") conductors, Thermal Resistant Aluminium Alloy Conductor Aluminium Clad Steel Reinforced ("TACSR/AW") conductors and Super Thermal Resistant Aluminium Alloy Conductor Aluminium Clad Invar Reinforced ("STACIR/AW") conductors.

Aluminium Conductor Composite Core ("ACCC") conductors comprise a concentrically stranded conductor with one or more layers of trapezoidal shaped annealed 1350-O aluminium wires on a central core of light weight carbon-glass fibre composite. ACCC conductors comprising a hybrid carbon composite core are stronger and lighter than traditional steel cores. ACCC conductors are capable of carrying twice the current of traditional ACSR conductors as ACCC conductors are designed for continuous operating temperatures of up to 180° C. in addition to its lighter core which allows approx. 30% more aluminium to be used without increasing the total weight. Usage of ACCC conductors reduces line losses by 30-40% under equal load conditions compared with traditional ACSR conductors of the same diameter and weight. ACCC conductors have greater strength, effective self-damping, superior fatigue resistance and a low coefficient of expansion thereby reducing conductor sag under heavy electrical load conditions. As a result, ACCC conductors can be used to increase spans between fewer or shorter structures. ACCC conductors have greater corrosion resistance than traditional ACSR conductors.

ACCC conductors are used for overhead distribution and transmission lines and are particularly useful in reconductoring applications requiring increased current with existing tensions and clearances, new line applications where structures can be economised due to reduced conductor sag, new line applications requiring high emergency loading and lines where vibration due to wind is a problem. ACCC conductors can also be used at corrosive and coastal environments due to their good corrosion resistance. Conventional ACCC conductors are typically rated up to a maximum operating temperature of 180° C.

Aluminium Conductor Steel Supported ("ACSS/MA") conductors comprise one or more layers of annealed aluminium 1350-O wires stranded over a central core of zinc-5% aluminium mischmetal alloy coated steel wires that are designed to withstand most or all of the mechanical load on the ACSS conductor. ACSS conductors may be manufactured according to ASTM B 856.

ACSS/MA conductors are similar to traditional ACSR conductors except that ACSS/MA conductors can be operated continuously at high temperatures up to 250° C. without damage. ACSS/MA conductors sag less under emergency loading than ACSR conductors, have self-damping properties and final sag is not affected by long time creep of the aluminium.

ACSS/MA conductors are used for overhead distribution and transmission lines and are particularly useful in reconductoring applications requiring increased current with existing tensions and clearances. ACSS/MA conductors are also used for new line applications where structures can be economised due to reduced conductor sag, new line applications requiring high emergency loadings and lines where vibration due to wind is a problem. Conventional ACSS/MA conductors are typically rated up to a maximum operating temperature of 250° C.

Aluminium Conductor Aluminium Clad Steel Supported ("ACSS/AW") conductors comprise one or more layers of annealed aluminium 1350-O wires stranded over a central core of aluminium clad steel wires that are designed to withstand most or all of the mechanical load on ACSS/AW conductors. ACSS/AW conductors may be manufactured according to ASTM B 856.

ACSS/AW conductors can operate continuously at high temperatures up to 200° C. without damage. The aluminium clad steel core which consists of a thick layer of aluminium (approx. 10% of the nominal wire radius) over steel gives ACSS/AW conductors the advantages of ACSS conductors along with light weight and good conductivity of aluminium with the high tensile strength and ruggedness of steel.

ACSS/AW conductors are used for overhead distribution and transmission lines and are especially useful in reconductoring applications requiring increased current with existing tensions and clearances. ACSS/AW conductors are also used for new line applications where structures can be economised due to reduced conductor sag, new line applications requiring high emergency loadings and lines where vibration due to wind is a problem.

ACSS/AW conductors have strength characteristics similar to ACSS conductors along with slightly greater ampacity and resistance to corrosion due to aluminium cladding of the steel core wires. Conventional ACSS/AW conductors are typically rated up to a maximum operating temperature of 200° C.

Thermal Resistant Aluminium Alloy Conductor Steel Reinforced ("TACSR") conductors comprise one or more layers of thermal resistant aluminium zirconium alloy (AT1) wires stranded over a central core of zinc coated steel wire(s) as per IEC 62004 and IEC 60888 and generally according to IEC 61089.

TACSR conductors are able to carry higher (150%) load current than traditional ACSR conductors as they are designed for continuous operating temperatures of up to 150° C. TACSR conductors have the same installation technique as ACSR conductors.

TACSR conductors are used for overhead distribution and transmission lines and are particularly useful in new line applications requiring increased current. Conventional TACSR conductors are typically rated up to a maximum operating temperature of 150° C.

Thermal Resistant Aluminium Alloy Conductor Aluminium Clad Steel Reinforced ("TACSR/AW") conductors comprise one or more layers of thermal resistant aluminium zirconium alloy (AT1) wires stranded over a central core of stranded aluminium clad steel (20SA Type A) wire(s) as per IEC 62004 and IEC 61232 and generally according to IEC 61089.

TACSR/AW conductors are able to carry higher load current than traditional ACSR conductors as they are designed for continuous operating temperatures of up to 150° C. TACSR/AW conductors have increased corrosion resistance and lower electrical resistance and lower mass than TACSR conductors. TACSR/AW conductors have the same installation technique as ACSR conductors.

TACSR/AW conductors are used for overhead distribution and transmission lines and are particularly useful in new line applications requiring increased current. TACSR/AW may be used at corrosive and coastal environments due to their good corrosion resistance. Conventional TACSR/AW conductors are typically rated up to a maximum operating temperature of 150° C.

Super Thermal Resistant Aluminium Alloy Conductor Aluminium Clad Invar Reinforced ("STACIR/AW") conductors comprise one or more layers of super thermal resistant aluminium zirconium alloy (AT3) wires stranded over a central core of stranded aluminium clad invar wires as per IEC 62004 and generally according to IEC 61089 and IEC 61232. Invar is a special Fe/Ni alloy having a very low coefficient of linear expansion.

STACIR/AW conductors are able to carry higher (200%) load current than traditional ACSR conductors as they are designed for continuous operating temperatures of up to 210° C. Beyond knee point STACIR/AW conductors experience a sag increase due to the expansion of the Invar core alone (extremely low value $\leq 3.7 \times 10^{-6}/°$ C.) which controls sag at high operating temperatures. STACIR/AW conductors have increased corrosion resistance and have the same installation technique as ACSR conductors.

STACIR/AW conductors are used for overhead distribution and transmission lines and are particularly useful in new line applications requiring increased current. STACIR/AW conductors may be used at corrosive and coastal environments due to their good corrosion resistance. Conventional STACIR/AW conductors are typically rated up to a maximum operating temperature of 210° C.

Accordingly, known HTLS conductors enable high voltage overhead electric conductors to be operated at significantly higher temperatures up to a maximum operating temperature in the range 150-250° C.

It will be appreciated that there can potentially be significant power losses due to Ohmic loses if an electric conductor is operated at a maximum operating temperature in the range 150-250° C. If the temperature of a conductor begins to approach the maximum operating temperature of e.g. 150-250° C. then the power operator is required to reduce the current being transmitted through the conductor in order to reduce Joule heating effects and thus ensure that the maximum safe operating temperature of the conductor is not exceeded. It will be appreciated that it is problematic for a utility company to have to reduce the current being transmitted through the conductor especially as the reduction in transmitted power may coincide with increased consumer or business demand for electricity.

It will be appreciated that a high voltage overhead electric power line installed in a hot region of the world such as the Middle East may operate at high ambient temperatures e.g. >40° C. Furthermore, the conductor may operate at a high maximum operating temperature in the range 150-250° C. It will be apparent that such conductors will suffer from the problem of having high energy losses due to the high resistance of the conductor at such elevated temperatures. Furthermore, the ampacity (i.e. maximum current carrying capacity) of the conductor will be reduced.

The amount of heat generated in an overhead electric conductor due to Ohmic losses (or Joule heating) will follow the following relationship:

$$\text{Ohmic losses} = I^2 R \quad (1)$$

wherein I is the current passing through the overhead electric conductor and R is the electrical resistance of the conductor.

It will also be understood that the electrical resistance R of an electric conductor is temperature dependent. The electric resistance R of a conductor as a function of temperature may be determined by the following relationship:

$$R_\theta = R_{20}[1+\alpha(\theta-20)]\Omega/\text{km} \quad (2)$$

wherein $R_\theta$ is the electrical DC resistance of the conductor at $\theta$° C., $R_{20}$ is the electrical DC resistance of the conductor at 20° C. and a is the temperature coefficient of resistance of the conductor. For aluminium, $\alpha = 0.00403$.

For completeness, cable ampacity or current carrying capacity is defined as the continuous maximum current that a conductor can carry at its maximum operating temperature.

Accordingly, a combination of Joule heating, high ambient temperatures, high solar heating and an absence of cooling due to air currents (e.g. wind) will result in the temperature of the conductor quickly rising. It will be understood that as the temperature of the conductor rises then in view of the positive correlation between temperature and resistance then the electrical resistance of the conductor will increase which will result in further electrical losses in the conductor (and hence further Joule heating). As a result, the temperature of the overhead electrical conductor will tend to increase yet further which only exacerbates the problem.

It is apparent, therefore, that operating an overhead electrical conductor in a particularly high temperature region of the world presents significant operational problems.

It is known to attempt to reduce the temperature of an overhead electric conductor by applying a coating to the conductor in order to reduce the temperature of the overhead conductor.

A first known approach involves utilising a black coating such as carbon black which has a high solar absorptivity of A=0.96 (R=0.04) but also a high emissivity of E=0.96. The first known approach focuses upon enabling a conductor to lose thermal energy which it has gained.

WO 2015/105972 (Ranganathan) is an example of a variant of the first known approach and discloses an arrangement comprising a conductor having a single polymeric layer of a carbon black based polymer. An infra-red ("IR") reflective agent may be included in the carbon black layer. The emissivity E of the conductor is stated as being $\geq 0.85$ and the overall absorptivity A is stated as being 0.3 (R$\geq$0.7).

WO 2014/025420 (Davis) discloses coating a bare conductor with a non-white (i.e. grey, black etc.) inorganic coating. It is stated that the non-white coating may have an emissivity E≥0.8 and a solar absorptivity coefficient A>0.3 (R<0.7). Colour may be defined with reference to CIE Publication 15.2(1986), section 4.2 and the disclosed CIE colour space which is organised as a cube with L*, a* and b* axes. The minimum for L* is 0 which represents perfect blackness. WO 2014/025420 (Davis) defines white as having a L*≥80. Accordingly, the non-white coating disclosed in WO 2014/025420 (Davis) is stated as having a L*<80 (i.e. is non-white).

A second different known approach is to coat the electric conductor with a white coating which has a low solar absorbance and hence a high solar reflectance.

For example, WO 2007/034248 (Simic) is an example of the second known approach and discloses coating a bare conductor with various white coatings which may in some cases have an emissivity E≥0.7 and a coefficient of solar absorption A≤0.3 (R≥0.7).

One disclosed coating in WO 2007/034248 (Simic) is titanium oxide ($TiO_2$) white paint with potassium silicate. The titanium oxide in the white paint provides the coating with a high emissivity of E=0.92. The absorptivity coefficient A is stated as being 0.17 and hence the reflectivity coefficient R is 0.83. The form of the titanium oxide is not stated in WO 2007/034248 (Simic) but it is assumed that the titanium oxide comprises rutile titanium dioxide ($TiO_2$) which is the most common form of titanium dioxide ($TiO_2$) and which is commonly used in white paint. Furthermore, as shown in FIG. 11 of the present application, rutile titanium dioxide ($TiO_2$) has a higher reflectance in the solar spectrum than the less common form of titanium dioxide ($TiO_2$) namely anatase titanium dioxide ($TiO_2$).

In addition to the first known approach (black coating) and the second known approach (white coating) it is known to provide specific formulations of a coating in order to solve other problems.

For example, FR-2971617 (Nexans) discloses coating an electrical conductor with a polyvinylidene difluoride ("PVDF") polymeric coating in order to improve the age resistance of the coating. The PVDF polymeric coating is stated as having an emissivity E≥0.85 and a solar absorptivity A≤0.10 (R≥0.90). FR-2971617 (Nexans) states that fabricating a temperature reducing coating for an overhead electrical conductor using PVDF results in the electrical conductor having an improved resistance to ultraviolet radiation and hence having an improved resistance to aging.

The PVDF coating disclosed in FR-2971617 (Nexans) may be applied to a conductor in the form of a paint comprising an organic solvent into which PVDF as a binder is dissolved. An additive such as a white pigment (e.g. barium sulphate, magnesium oxide or aluminium oxide) may be added to the paint in order the achieve the stated emissivity and solar absorptivity values. According to a disclosed arrangement the liquid paint may comprise a liquid paint marketed by ARKEMA® referred to as KYNAR® 500 in which was added a white pigment comprising either magnesium oxide (E=0.9, A=0.09, R=0.81), aluminium oxide (E=0.9, A=0.09, R=0.81) or barium sulphate (E=0.88, A=0.06, R=0.94).

In summary, it is known to coat an overhead conductor with a black coating in order to maximise the emissivity E of the conductor or alternatively to coat an overhead conductor with a white coating having a low solar absorbance A and hence a correspondingly high solar reflectance R.

However, the present inventors have tested conventional coatings and have found that both known approaches only result in a limited improvement in performance (i.e. a small reduction in temperature) or indeed in some cases they have found that e.g. a white coating without, for example, a thermal emitter additive actually results in worse performance than a bare uncoated conductor. Furthermore, some known white coatings and have been found to have a poor corrosion resistance and to discolour rapidly making them commercially impractical.

In particular, it has been suggested that a magnesium oxide white paint might be applied to an overhead conductor in order to reduce the operating temperature of the conductor. However, the present inventors have been unable to replicate any such alleged performance benefits and indeed theoretical calculations (see Table 1 below) and empirical testing of certain white painted conductors was found by the present inventors to result in an increase in the temperature of the conductor rather than a reduction of the temperature of the conductor.

The present inventors therefore consider that coating an overhead conductor with e.g. a magnesium oxide white paint per se is disadvantageous in terms of performance and highly problematic in terms of poor corrosion resistance.

Accordingly, there remains a need for an improved overhead conductor having an improved temperature reduction performance together with having a good or excellent corrosion resistance and which remains white for an extended period of time.

Furthermore, various embodiments of the present invention are concerned with High Temperature Low Sag ("HTLS") conductors having a maximum operating temperature in the range 150-250° C. At such elevated temperatures problems with known coated conductors become particularly acute.

An improved overhead conductor capable of providing significant temperature reduction effects particularly at elevated operating temperatures in the range 150-250° C. would result in a significant reduction in power losses coupled with a higher ampacity.

It will be understood by those skilled in the art that the ability to provide an improved overhead conductor capable of operating at elevated temperatures (e.g. in the range 150-250° C.), with good corrosion resistance, which remains white for an extended period of time and having an improved temperature reduction performance would be of significant commercial interest and would represent a significant advance in the art.

A particularly significant problem with white coated conductors which is often overlooked is that white coatings will accrete dirt and will discolour over a period of time as the conductor is exposed to environmental pollutants or contaminants. As a result, the initial high solar reflectance can rapidly drop as the white coating discolours resulting in a significant reduction in performance. For example, it has been reported that materials having a high initial reflectance R of >0.80 may experience a reduction of reflectance R by an average of 0.16 over three years.

Other studies have shown that the darkening effects on the solar reflectance of roof members resulted in a 11-59% reduction in solar reflectance after a period of 5-8 years of outdoor exposure.

It is therefore also desired to provide an improved overhead conductor which is less prone to discolouration by accreting dirt and environmental pollutants and hence which shows a reduced or negligible loss in performance with time by virtue of the conductor remaining white for an extended period of time.

SUMMARY OF THE PRESENT INVENTION

According to an aspect of the present invention there is provided a single coated conductor for an overhead power transmission or distribution line comprising:

one or more electrical conductors; and a first coating provided on at least a portion of the one or more electrical conductors, wherein the first coating comprises:

(i) an inorganic binder comprising an alkali metal silicate;

(ii) a polymerisation agent comprising nanosilica ("nS") or colloidal silica ($SiO_2$); and (iii) a photocatalytic agent, wherein the photocatalytic agent comprises ≥70 wt % anatase titanium dioxide ($TiO_2$) having an average particle size ("aps") ≥100 nm;

wherein the first coating has an average thermal emissivity coefficient E≥0.90 across the infrared spectrum 2.5-30.0 µm and has an average solar reflectivity coefficient R≥0.90 and/or an average solar absorptivity coefficient A≤0.10 across the solar spectrum 0.3-2.5 µm.

According to various embodiments the first coating may have an average thermal emissivity coefficient E in the range 0.90-0.91, 0.91-0.92, 0.92-0.93, 0.93-0.94, 0.94-0.95, 0.95-0.96, 0.96-0.97, 0.97-0.98, 0.98-0.99 or 0.99-1.00 across the infrared spectrum 2.5-30.0 µm.

According to various embodiments the first coating may have an average solar reflectivity coefficient R in the range 0.90-0.91, 0.91-0.92, 0.92-0.93, 0.93-0.94, 0.94-0.95, 0.95-0.96, 0.96-0.97, 0.97-0.98, 0.98-0.99 or 0.99-1.00 and/or an average solar absorptivity coefficient A in the range 0.00-0.01, 0.01-0.02, 0.02-0.03, 0.03-0.04, 0.04-0.05, 0.05-0.06, 0.06-0.07, 0.07-0.08, 0.08-0.09 or 0.09-0.10 across the solar spectrum 0.3-2.5 µm.

The alkali (or alkaline) metal silicate preferably comprises potassium silicate ($K_2SiO_3$). Alternatively, the alkali (or alkaline) metal silicate may comprise sodium silicate. The sodium silicate may comprise sodium metasilicate ($Na_2SiO_3$), sodium orthosilicate ($Na_4SiO_4$) or sodium pyrosilicate ($NaSi_2O_7$).

According to an embodiment the alkali (or alkaline) metal silicate may comprise lithium silicate ($Li_2SiO_3$).

According to another embodiment the alkali (or alkaline) metal silicate may comprise calcium silicate ($Ca_2SiO_4$) or calcium orthosilicate.

According to another embodiment the alkali (or alkaline) metal silicate may comprise magnesium aluminium silicate ($AlMgSiO_4$).

The alkali metal silicate preferably comprises a water based coating which is dehydrated, dried or cured after the first coating is provided on at least a portion of the one or more electrical conductors. The water based coating may be dehydrated or dried by thermal curing.

The present invention represents a significant advance in the art as an overhead conductor according to the present invention has both a high average thermal emissivity coefficient E (i.e. E≥0.90) across the infrared spectrum 2.5-30.0 µm and also a high average solar reflectivity coefficient R (i.e. R≥0.90) across the solar spectrum 0.3-2.5 µm.

It will be recalled that known conductors having a single black coating have a high thermal emissivity coefficient E but a poor solar reflectivity coefficient R. Conversely, other known conductors having a single white coating have a high solar reflectivity coefficient R but a poor thermal emissivity coefficient E.

Accordingly, a single coated conductor according to the present invention has a significantly improved performance in terms of temperature reduction performance relative to conventional single coated conductors. The single coated conductor according to the present invention also has a good or excellent corrosion resistance in contrast to some known single coatings such as magnesium oxide white paint.

Importantly, the addition of a photocatalytic agent comprising 70 wt % anatase titanium dioxide ($TiO_2$) and preferably having an average particle size s 100 nm results in the photocatalytic conversion of any organic matter which may have adhered or which may otherwise adhere to the coating. In particular, when anatase titanium dioxide ($TiO_2$) is excited by UV light it creates hydroxyl ($OH^-$) and superoxide ($O_2$) radicals which will decompose surface organic matter into carbon dioxide ($CO_2$) and water ($H_2O$).

According to an embodiment the photocatalytic agent may comprise a commercially available form of titanium dioxide ($TiO_2$) known as DEGUSSA (EVONIK)® P25 or AEROXIDE® $TiO_2$ P25.

DEGUSSA (EVONIK)® P25 titanium oxide ($TiO_2$) is a conventional powdered form of titanium dioxide ($TiO_2$). The properties of P25 titanium oxide have been investigated in detail and reference is made to the Journal of Photochemistry and Photobiology A: Chemistry, 216(2-3): 179-182 which found that the powder comprised titanium dioxide ($TiO_2$) in the ratio anatase:rutile:amorphous 78:14:8.

It is noted that DEGUSSA (EVONIK)® P25 is commonly reported as comprising 70:30, 80:20 or 85:15 anatase:rutile crystallites and that no reference is often made to the presence of the amorphous form of titanium dioxide ($TiO_2$).

It has been reported that the average particle size ("aps") of the anatase titanium dioxide ($TiO_2$) in DEGUSSA (EVONIK)® P25 is approximately 85 nm and that the average particle size of rutile titanium dioxide ($TiO_2$) in DEGUSSA (EVONIK)® P25 is approximately 25 nm.

Titanium dioxide ($TiO_2$) is particularly preferred as a photocatalyst according to embodiments of the present invention for decomposition of organic pollutants because it is chemically stable and biologically benign. The band gap of titanium dioxide ($TiO_2$) is larger than 3 eV (~3.0 for rutile and ~3.2 for anatase) thereby making pure titanium dioxide ($TiO_2$) primarily active for UV light.

It is believed that the specific phase mixture of different polymorphs of titanium dioxide ($TiO_2$) as are present in DEGUSSA (EVONIK)® P25 have a synergistic effect and an increased photocatalytic activity is observed compared to pure phases (i.e. either relative to pure rutile titanium dioxide ($TiO_2$) or to pure anatase titanium dioxide ($TiO_2$)).

It is also generally accepted that pure anatase titanium dioxide ($TiO_2$) exhibits a higher photocatalytic activity than pure rutile titanium dioxide ($TiO_2$).

It is known that anatase titanium dioxide ($TiO_2$) has a larger band gap than rutile titanium dioxide ($TiO_2$). While this reduces the light that can be absorbed, it may raise the valence band maximum to higher energy levels relative to redox potentials of adsorbed molecules. Accordingly, the oxidation power of electrons may be increased and electron transfer may be facilitated from the titanium dioxide ($TiO_2$) to the adsorbed molecules.

U.S. Pat. No. 9,595,368 (Ranganathan) discloses the use of photocatalytic self-cleaning coatings both directly on overhead conductors, and on top of intermediate layers such as inorganic silicate coatings or PVDF based coatings designed to increase the emissivity of the conductors. However, such an arrangement is sub-optimal for a number of reasons. The disclosed arrangements are not suitable for white, solar reflective overhead conductors as the use of the disclosed self-cleaning coatings can materially affect the performance of the solar reflective layer.

For example, U.S. Pat. No. 9,595,368 (Ranganathan) discloses that the application of a KON CORPORATION® self-cleaning layer, in accordance with the manufacturer's application instructions, on top of a solar reflective layer comprising titanium dioxide ($TiO_2$) in a PVDF binder decreased the solar reflectivity of a white coating from 0.89 to 0.77. PVDF is a fluoropolymer with a very low surface energy. As a result, PVDF will repel both aqueous and solvent based coatings with a high water contact angle thereby generally making it difficult to form uniform films on the coating.

As such, the use of an intermediate layer as disclosed in U.S. Pat. No. 9,595,368 (Ranganathan) is not a suitable solution for maintaining solar reflectivity overtime.

Further, when applied directly to silicates, an intermediate layer approach increases expense of application in the continuous manufacturing process.

To address this, the present invention integrates solar reflectivity and self-cleaning photocatalytic activity into a single layer. Not only does this save on application complexity/expense, but it also avoids self-cleaning top coats materially affecting the optics of the underlying white reflective coating.

A single conductor according to the present invention has a significantly improved performance at lower temperatures (e.g. up to 80° C.).

It is not known to provide a single coated conductor which is arranged to have both a very high emissivity E (E≥0.90) and also a very high solar reflectance (R≥0.90) coupled with good or excellent corrosion resistance and a photocatalytic agent which is effective at converting organic matter (which may accrete on the conductor) into carbon dioxide and water.

According to various embodiments the emissivity E of the single coated conductor may be such that E≥0.91, E≥0.92, E≥0.93, E≥0.94, E≥0.95, E≥0.96, E≥0.97, E≥0.98 or E≥0.99. Similarly, according to various embodiments the reflectance R may be such that R≥0.91, R≥0.92, R≥0.93, R≥0.94, R≥0.95, R≥0.96, R≥0.97, R≥0.98 or R≥0.99.

Differences between various known conventional approaches and the approach according to the present invention will now be discussed in further detail below.

WO 2015/105972 (Ranganathan) discloses an arrangement comprising a conductor having a single polymeric layer of a carbon black based polymer which is a good infra-red emitter. The emissivity E is stated as being 0.85 (i.e. relatively good) but the absorptivity A is stated as only being 0.3 (i.e. poor).

In contrast, the single coated conductor according to the present invention has an improved emissivity E≥0.90 compared with the coating disclosed in WO 2015/105972 (Ranganathan) which has a lower emissivity E≥0.85. Furthermore, importantly a conductor according to the present invention also has a significantly improved solar reflectance (R≥0.90) which is significantly superior to the reflectance of the conductor disclosed in WO 2015/105972 (Ranganathan) which is stated as having a much lower reflectance of R≥0.70 (based upon a stated absorptivity coefficient A≤0.3).

US 2015/0194237 (Ranganathan) discloses a conductor having a self-cleaning coating comprising a photocatalyst such as anatase titanium oxide. However, the photocatalyst is not provided in a binder—the self-cleaning layer is described as being free of polymer and the photocatalyst is described as being free from a polymeric binder. Accordingly, US 2015/0194237 (Ranganathan) does not disclose providing a coating comprising an inorganic binder comprising an alkali metal silicate. US 2015/0194237 (Ranganathan) also does not disclose providing a polymerisation agent comprising either nanosilica or colloidal silica as is required by the present invention. According to the present invention the addition of nanosilica or colloidal silica as a polymerisation agent has the effect of increasing the inherent emissivity of the silicate binder thereby further improving the cooling effect. US 2015/0194237 (Ranganathan) does not disclose providing a coating which has both a high thermal emissivity E≥90% in the infrared and also a high solar reflectivity R 90% in the solar spectrum 0.3-2.5 µm.

WO 2014/025420 (Davis) discloses coating an overhead conductor with a single layered coating comprising an inorganic binder (e.g. metal silicate or colloidal silica ($SiO_2$)) and a heat radiating agent such as boron carbide ($B_4C$), titanium dioxide ($TiO_2$) or silicon dioxide ($SiO_2$). A number of different coatings are disclosed as having been formulated and tested.

Out of all the various different formulations disclosed in WO 2014/025420 (Davis) it is considered that perhaps the closest formulation to the present invention is coating #7 which comprises a silicate binder (20% weight), silicon dioxide (37% weight), boron carbide (3% weight) and water (40% weight). The overall known coating has a dark grey colour with a L* of 43.495. The dark grey coating is stated as having an emissivity E of 0.882 which is lower than the requirements of the present invention namely that the conductor has a higher emissivity coefficient E≥0.90.

Furthermore, the solar absorptivity A of the dark grey coating #7 disclosed in WO 2014/025420 (Davis) is stated as being A=0.86 which is significantly higher than the requirements of the present invention which requires that the solar absorptivity coefficient A≤0.10. Equally, the solar reflectance of the dark grey coating #7 is R=0.14 which is significantly lower than the requirements of the present invention which requires the conductor to have a high solar reflectance R≥0.90.

Accordingly, the various compositions disclosed in WO 2014/025420 (Davis) are not considered to be particularly relevant to the present invention.

US 2016/0032107 (Siripurapu) discloses a two part compositional kit for creating a coating to coat a conductor with a single coating. The first part of the kit comprises a filler (2-55% by dry weight of the compositional kit), a cross-linking agent (5-20% by dry weight of the compositional kit) and an emissivity agent (6-42% by dry weight of the compositional kit). The filler may comprise quartz or aluminium oxide. The cross-linking agent may comprise magnesium hydroxide ($Mg(OH)_2$), magnesium oxide (MgO) or zinc oxide (ZnO). The emissivity agent may comprise silicon dioxide ($SiO_2$) or titanium dioxide ($TiO_2$). The second part of the kit comprises an alkali earth metal silicate binder (20-65% by dry weight of the compositional kit). The alkali earth metal silicate binder may comprise potassium silicate sodium silicate, lithium silicate, calcium silicate or magnesium aluminium silicate.

Two examples are given in US 2016/0032107 (Siripurapu). Example #1 has an emissivity E of 0.86 which is less than the requirements of the present invention (E≥0.90). Furthermore, example #1 has a high solar absorptivity A of 0.55 which is significantly higher than the requirements of the present invention which requires the absorptivity coefficient A≤0.10.

Paragraphs [0004] and [0006] of US 2016/0032107 (Siripurapu) teach that different white coatings are known which have a much lower thermal emissivity E≥70% (in the infrared) and a much lower solar reflectivity R 70% (absorptivity s 30%) in the solar spectrum 0.3-2.5 µm than a coating according to the present invention.

It will be understood by those skilled in the art that a conventional white coated conductor having an E≥70% and a solar reflectivity R 70% is significantly inferior to a (white)

coated conductor according to the present invention which has an E≥90% and a solar reflectivity R 90%.

According to US 2016/0032107 (Siripurapu) a coating composition for a conductor is disclosed comprising 6-42 wt % of an emissivity agent which may comprise titanium dioxide. Two specific examples are given on page 7 ("Example 1" and "Example 2") and reference is made to Table 1. It is assumed from the context that the titanium dioxide is provided in the rutile form not the less common anatase form according to the present invention especially as no mention is made of photocatalysts. The rutile form as assumed to be disclosed in US 2016/0032107 (Siripurapu) is likely to have an average particle size larger than 100 nm contrary to the requirements of the present invention. According to various preferred embodiments of the present invention an additional reflective agent may be provided in the form of rutile titanium dioxide which has an average particle size of hundreds of nm. The emissivity and solar absorptivity of Example 1 as disclosed in US 2016/0032107 (Siripurapu) was tested and the results are shown in Table 3 of US 2016/0032107 (Siripurapu). It will be noted that the emissivity E is stated as being 86% which is lower than the 90% requirement according to the present invention. The solar absorptivity A is also stated as being 55% and hence the corresponding solar reflectivity R is 45%. It will be apparent, therefore, that whilst the emissivity E is high (86%), the solar reflectivity R at 45% is much lower than the requirement of the present invention which requires a solar reflectivity R≥90%.

Accordingly, US 2016/0032107 (Siripurapu) does not disclose providing a single coated conductor having a polymerisation agent comprising either nanosilica or colloidal silica which it combination with a photocatalytic agent comprising ≥70 wt % anatase titanium dioxide provides a coating having an emissivity E≥90% and a solar reflectivity R≥90% as is required by the present invention.

US 2005/0266981 (Nakajima) discloses providing a liquid composition that includes a photocatalytic material dispersed in a hydrophilic binder that includes an essentially completely hydrolysed organosilicate (paragraph [0002]). According to paragraph [0093] the liquid composition may be applied to a high voltage cable. However, the present invention relates to a single coated conductor for an overhead power transmission or distribution line. Applying a liquid composition as disclosed in US 2005/0266981 (Nakajima) to a high voltage cable would result in an electrical conductor which had two coatings—a first inner insulating coating and a second outer hydrophilic coating and as such would not meet the requirements of the present invention.

WO 2007/034248 (Simic) discloses a number of white coatings. One disclosed coating is magnesium oxide aluminium oxide paint. This is reported as having a low absorptivity and a high emissivity. The present invention is different in that according to the present invention a photocatalytic agent comprising anatase titanium dioxide ($TiO_2$) is included. Furthermore, magnesium oxide aluminium oxide paint has been tested but has been found to have an inferior performance to that stated in WO 2007/034248 (Simic). The paint is also problematic to apply and cure and is not considered to be durable. Accordingly, magnesium oxide aluminium oxide paint is not considered to present a commercial solution.

Another problem with attempting to use magnesium oxide as a coating is that magnesium oxide will act as a sacrificial corrosion primer as it corrodes very easily. Accordingly, the optical properties of the magnesium oxide coating will deteriorate rather rapidly. Magnesium is the most electrochemically active metal used in engineering applications and corrodes so readily in some environments that magnesium and magnesium alloys are purposely utilised as sacrificial anodes on steel structures such as ship hulls and steel pipes. Magnesium and magnesium alloys stored at room temperature or in humid atmospheric conditions develop a compositionally varied surface film consisting of magnesium oxide, hydroxide and carbonates. These films are less stable than the passive films formed on metals such as aluminium and stainless steels.

It has also been observed that magnesium rich primers fail rapidly and exhibit heavy blistering very early on in salt spray tests (ASTM B117) which is a key test for certifying coatings for corrosion protection.

Accordingly, the magnesium oxide white paint coating disclosed in WO 2007/034248 (Simic) is not considered to be relevant to the present invention and is not considered as offering a practical commercial solution to the problems which the present invention seeks to address.

Another disclosed composition in WO 2007/034248 (Simic) is titanium oxide white paint with potassium silicate. However, this has a stated absorptivity of A=0.17 i.e. higher than the requirements of the present invention.

Accordingly, although a few of the white paint compositions disclosed in WO 2007/034248 (Simic) may initially appear to be potentially relevant to the present invention, upon more detailed consideration and further investigation their performance has been found to be inferior to that of a single coated conductor in accordance with the present invention.

FR-2971617 (Nexans) discloses a white paint having a white pigment such as magnesium oxide, aluminium oxide or barium sulphate. The polymeric coating has an emissivity E≥0.7 and a solar absorption coefficient A≤0.3. Accordingly, it is apparent that the requirements of the present invention are not met.

It will be apparent, therefore, that the various known approaches to providing a coating which will reduce the temperature of an overhead conductor are limited to providing a single coating which does not meet the dual requirements of the present invention namely of providing a conductor which has both a very high emissivity E≥0.90 and also a very high solar reflectivity R≥0.90 (or conversely a very low solar absorptivity A≤0.10).

It will be apparent, therefore, that the present invention represents a significant advance in the art since a single coated conductor according to the present invention has a significantly improved temperature performance. As a result, the single coated conductor according to the present invention exhibits advantageously reduced power losses and further advantageously has a higher ampacity relative to conventional monolayer coated conductors or bare conductors.

A single coated conductor according to the present invention also has a good or excellent corrosion resistance in contrast to some known coatings.

Furthermore, a significant advantage of the single coating according to the present invention is that the presence of a photocatalytic agent which preferably acts to convert organic matter which may have accreted onto the conductor into carbon dioxide and water. As a result, a single coated conductor according to the present invention will suffer less discolouration than other known temperature reducing white coatings applied to overhead power transmission or distribution lines and hence the performance of such coated conductors according to the present invention will remain high over an extended period of time. This is in contrast to known coated conductors which suffer from a marked deterioration in performance over a relatively short period of time due to becoming dirty, discloured and having a reduced reflectance.

It will be appreciated, therefore, that the single coated conductor according to the present invention which includes a self-cleaning photocatalytic agent in the form of anatase titanium dioxide ($TiO_2$) is of significant commercial interest.

The photocatalytic agent preferably further comprises ≥75%, ≥80%, ≥85%, ≥90%, ≥95% or ≥99% wt % anatase titanium dioxide ($TiO_2$).

The single coated conductor may be arranged and adapted to operate, in use, at a temperature of 60-300° C. or 90-250° C. above ambient temperature.

According to various embodiments the single coated conductor may further comprise a reflective agent.

The reflective agent preferably comprises rutile titanium dioxide ($TiO_2$). The rutile titanium dioxide ($TiO_2$) may have an average particle size ("aps"): (i) ≥100 nm; (ii) 100-200 nm; (iii) 200-300 nm; (iv) 300-400 nm; (v) 400-500 nm; (vi) 500-600 nm; (vii) 600-700 nm; (viii) 700-800 nm; (ix) 800-900 nm; and (x) 900-1000 nm.

According to various embodiments the rutile titanium dioxide ($TiO_2$) comprises substantially spherical particles (as opposed to having a nanorod structure).

According to an embodiment the reflective agent may comprise sodium aluminosilicate ($AlNa_{12}SiO_5$). In particular, the sodium aluminosilicate ($AlNa_{12}SiO_5$) may be provided in conjunction with other reflective agents such as rutile titanium dioxide ($TiO_2$).

The reflective agent may comprise a white filler such as: (i) magnesium oxide (MgO); (ii) calcium oxide (CaO); (iii) aluminium oxide ($Al_2O_3$); (iv) zinc oxide (ZnO); (v) calcium carbonate ($CaCO_3$); (vi) aluminium silicate ($A_2SiO_5$); (vii) kaolin ($Al_2O_3.2SiO_2$); (viii) titanium dioxide ($TiO_2$); or (viii) barium sulphate ($BaSO_4$).

According to various embodiments the single coated conductor may further comprise an emissive agent. The emissive agent may comprise an inorganic filler, wherein the inorganic filler may comprise either: (i) calcium carbonate ($CaCO_3$); (ii) calcined kaolin ($Al_2O_3.2SiO_2$); or (iii) talc (hydrated magnesium silicate ($H_2Mg_3(SiO_3)_4$ or $Mg_3Si_4O_{10}(OH)_2$)).

According to various embodiments the single coated conductor may further comprise a curing agent. The curing agent may be selected from the group consisting of: (i) zinc oxide (ZnO); (ii) zinc stearate ($C_{36}H_{70}O_4Z_n$); (iii) trimagnesium orthophosphate ($Mg_3O_8P_2$); (iv) magnesium oxide (MgO); (v) magnesium carbonate ($MgCO_3$); and (vi) magnesium hydroxide ($Mg(OH)_2$).

According to various embodiments the single coated conductor may further comprise an emulsion agent and/or rheology agent. The emulsion agent and/or a rheology agent may be selected from the group consisting of: (i) hydroxyethyl cellulose ($CH_2CH_2OH$); and (ii) polydimethylsiloxane ("PDMS" ($C_2HOSi)_n$).

The first coating is preferably substantially white in colour and preferably has a $L^*≥80$, $L^*≥85$, $L^*≥90$ or a $L^*≥95$ i.e. has a high degree or level of whiteness.

The first coating preferably has an average thermal emissivity coefficient $E≥0.90$ across the infrared spectrum 2.5-30.0 μm when tested in accordance with ASTM E408 (2013) and/or an average solar reflectivity coefficient $R≥0.90$ and/or an average solar absorptivity coefficient $A≤0.10$ across the solar spectrum 0.3-2.5 μm when tested in accordance with ASTM E903 (2012).

The single coated conductor when tested in accordance with ANSI C119.4-2004 preferably operates at a lower temperature than the temperature of the same one or more electrical conductors without the first coating.

The one or more electrical conductors are preferably arranged and adapted to transmit, in use, electrical power at a voltage 2 kV, 2-50 kV, 50-100 kV, 100-150 kV, 150-200 kV, 200-250 kV, 250-300 kV, 300-350 kV, 350-400 kV, 400-450 kV, 450-500 kV, 500-550 kV, 550-600 kV, 600-650 kV, 650-700 kV, 700-750 kV, 750-800 kV or 800 kV.

The single coated conductor is preferably arranged and adapted to operate, in use, up to a maximum operating temperature of 80° C., 90° C., 100° C., 110° C., 120° C., 130° C., 140° C., 150° C., 160° C., 170° C., 180° C., 190° C., 200° C., 210° C., 220° C., 230° C., 240° C., 250° C., 260° C., 270° C., 280° C., 290° C., 300° C. or >300° C.

The single coated conductor is preferably arranged and adapted to be suspended, in use, between overhead pylons.

The one or more electrical conductors preferably comprise one or more metallic conductors.

The one or more electrical conductors preferably comprise one or more metal cables.

The one or more metallic conductors and/or the one or more metal cables preferably comprise aluminium or an aluminium alloy.

The one or more electrical conductors preferably comprise one or more: (i) All Aluminium Conductors ("AAC"); (ii) All Aluminium Alloy Conductors ("AAAC"); (iii) Aluminium Conductor Steel Reinforced ("ACSR") conductors; (iv) Aluminium Conductor Aluminium Clad Steel Reinforced ("ACSR/AW") conductors; (v) Areal Bundled Cables ("ABC"); (vi) High Temperature Low Sag ("HTLS") conductors; (vii) Aluminium Conductor Composite Core ("ACCC") conductors; (viii) Aluminium Conductor Steel Supported ("ACSS/MA") conductors; (ix) Aluminium Conductor Aluminium Clad Steel Supported ("ACSS/AW") conductors; (x) Thermal Resistant Aluminium Alloy Conductor Steel Reinforced ("TACSR") conductors; (xi) Thermal Resistant Aluminium Alloy Conductor Aluminium Clad Steel Reinforced ("TACSR/AW") conductors; or (xii) Super Thermal Resistant Aluminium Alloy Conductor Aluminium Clad Invar Reinforced ("STACIR/AW") conductors.

The first coating preferably has a thickness in the range 1-10 μm, 10-20 μm, 20-30 μm, 30-40 μm, 40-50 μm, 50-60 μm, 60-70 μm, 70-80 μm, 80-90 μm, 90-100 μm, 100-110 μm, 110-120 μm, 120-130 μm, 130-140 μm, 140-150 μm, 150-160 μm, 160-170 μm, 170-180 m, 180-190 μm, 190-200 μm, 200-300 μm, 300-400 μm, 400-500 μm, 500-600 μm, 600-700 μm, 700-800 μm, 800-900 μm, 900-1000 μm or >1 μmm.

According to an aspect of the present invention there is provided an overhead conductor, a high voltage overhead conductor or an electric power or distribution line comprising one or more single coated conductors as described above.

According to another aspect of the present invention there is provided a kit for coating one or more electrical conductors to form a single coated conductor for an overhead power transmission or distribution line, the kit comprising:

a first part comprising: (i) an inorganic binder comprising an alkali metal silicate; (ii) a polymerisation agent comprising nanosilica ("nS") or colloidal silica ($SiO_2$); and (iii) a photocatalytic agent, wherein the photocatalytic agent comprises ≥70 wt % anatase titanium dioxide ($TiO_2$) having an average particle size ("aps") ≤100 nm; and a second part comprising: (i) a curing agent;

wherein, in use, the first and second parts are mixed together to form a first mixture and the first mixture is then sprayed, painted, coated or applied on to at least a portion of one or more electric conductors to form a first coating, wherein the first coating (preferably when dried or otherwise dehydrated) has an average thermal emissivity coefficient E≥0.90 across the infrared spectrum 2.5-30.0 µm and an average solar reflectivity coefficient R≥0.90 and/or an average solar absorptivity coefficient A≤0.10 across the solar spectrum 0.3-2.5 µm.

The inorganic binder preferably comprises a water based inorganic binder which is subsequently dehydrated, dried or otherwise thermally cured.

The first part may further comprise one or more of: (i) a reflective agent; (ii) an emissive agent; (iii) a curing agent; and (iv) an emulsion agent and/or rheology agent.

The second part may further comprise one or more of: (i) a reflective agent; (ii) an emissive agent; (iii) a curing agent; and (iv) an emulsion agent and/or a rheology agent.

The kit may further comprise a first device for spraying, painting or applying the first mixture on to at least a portion of one or more electric conductors to form the first coating. The first mixture once applied to the electric conductor(s) is then preferably dried, dehydrated or cured so as to form the first coating.

According to another aspect of the present invention there is provided a method of coating one or more electrical conductors to form a single coated conductor for an overhead power transmission or distribution line comprising:

spraying, painting, coating or applying a first coating or first mixture on to at least a portion of one or more electrical conductors, wherein the first coating or first mixture comprises:

(i) an inorganic binder comprising an alkali metal silicate;
(ii) a polymerisation agent comprising nanosilica ("nS") or colloidal silica (SiO$_2$); and
(iii) a photocatalytic agent, wherein the photocatalytic agent comprises ≥70 wt % anatase titanium dioxide (TiO$_2$) having an average particle size ("aps") ≤100 nm; wherein the first coating or first mixture has an average thermal emissivity coefficient E≥0.90 across the infrared spectrum 2.5-30.0 µm and has an average solar reflectivity coefficient R≥0.90 and/or an average solar absorptivity coefficient A≤0.10 across the solar spectrum 0.3-2.5 µm.

The inorganic binder comprises a water based inorganic binder and the method further comprises dehydrating or drying the inorganic binder. The first mixture preferably dries to form the first coating.

The method preferably further comprises thermally curing the first coating or first mixture.

According to an aspect of the present invention there is provided a method of retro-fitting an overhead power transmission or distribution line comprising one or more electrical conductors, the method comprising:

spraying, painting, coating or applying a first coating or first mixture on to at least a portion of one or more electrical conductors, wherein the first coating or first mixture comprises:

(i) an inorganic binder comprising an alkali metal silicate;
(ii) a polymerisation agent comprising nanosilica ("nS") or colloidal silica (SiO$_2$); and
(iii) a photocatalytic agent, wherein the photocatalytic agent comprises ≥70 wt % anatase titanium dioxide (TiO$_2$) having an average particle size ("aps") ≤100 nm; wherein the first coating or first mixture has an average thermal emissivity coefficient E≥0.90 across the infrared spectrum 2.5-30.0 µm and has an average solar reflectivity coefficient R≥0.90 and/or an average solar absorptivity coefficient A≤0.10 across the solar spectrum 0.3-2.5 µm.

The inorganic binder comprises a water based inorganic binder and the method further comprises dehydrating, drying or curing the inorganic binder.

The method further comprises thermally curing the first coating or first mixture.

The method preferably further comprises drying, allowing to dry, air wiping, heating, subjecting to a direct flame or curing the first coating or first mixture.

According to an aspect of the present invention there is provided a single coated conductor for an overhead power transmission or distribution line comprising: one or more electrical conductors; and a first coating provided on at least a portion of the one or more electrical conductors, wherein the first coating comprises:

(i) an inorganic binder optionally comprising an alkali metal silicate;
(ii) a polymerisation agent optionally comprising nanosilica ("nS") or colloidal silica (SiO$_2$); and
(iii) a photocatalytic agent optionally wherein the photocatalytic agent comprises ≥70 wt % anatase titanium dioxide (TiO$_2$) having an average particle size ("aps") ≤100 nm.

Preferably, the first coating may have an average thermal emissivity coefficient E≥0.90 across the infrared spectrum 2.5-30.0 µm and optionally an average solar reflectivity coefficient R≥0.90 and/or an average solar absorptivity coefficient A≤0.10 across the solar spectrum 0.3-2.5 µm.

According to various embodiments the first coating may have an average thermal emissivity coefficient E in the range 0.90-0.91, 0.91-0.92, 0.92-0.93, 0.93-0.94, 0.94-0.95, 0.95-0.96, 0.96-0.97, 0.97-0.98, 0.98-0.99 or 0.99-1.00 across the infrared spectrum 2.5-30.0 µm.

According to various embodiments the first coating may have an average solar reflectivity coefficient R in the range 0.90-0.91, 0.91-0.92, 0.92-0.93, 0.93-0.94, 0.94-0.95, 0.95-0.96, 0.96-0.97, 0.97-0.98, 0.98-0.99 or 0.99-1.00 and/or an average solar absorptivity coefficient A in the range 0.00-0.01, 0.01-0.02, 0.02-0.03, 0.03-0.04, 0.04-0.05, 0.05-0.06, 0.06-0.07, 0.07-0.08, 0.08-0.09 or 0.09-0.10 across the solar spectrum 0.3-2.5 µm.

According to another aspect of the present invention there is provided a kit for coating one or more electrical conductors to form a single coated conductor for an overhead power transmission or distribution line, the kit comprising:

a first part comprising: (i) an inorganic binder optionally comprising an alkali metal silicate; (ii) a polymerisation agent optionally comprising nanosilica ("nS") or colloidal silica (SiO$_2$); and (iii) a photocatalytic agent optionally wherein the photocatalytic agent comprises ≥70 wt % anatase titanium dioxide (TiO$_2$) having an average particle size ("aps") ≤100 nm; and a second part comprising: (i) a curing agent;

wherein, in use, the first and second parts are mixed together to form a first mixture and wherein optionally the first mixture is then sprayed, painted, coated or applied on to at least a portion of one or more electric conductors to form a first coating. The first mixture preferably dries to form the first coating.

Preferably, the first coating or first mixture has an average thermal emissivity coefficient E≥0.90 across the infrared spectrum 2.5-30.0 µm and an average solar reflectivity coefficient R≥0.90 and/or an average solar absorptivity coefficient A≤0.10 across the solar spectrum 0.3-2.5 µm.

According to another aspect of the present invention there is provided a method of coating one or more electrical conductors to form a single coated conductor for an overhead power transmission or distribution line comprising:

spraying, painting, coating or applying a first coating or first mixture on to at least a portion of one or more electrical conductors, wherein the first coating or first mixture comprises:

(i) an inorganic binder optionally comprising an alkali metal silicate; (ii) a polymerisation agent optionally comprising nanosilica ("nS") or colloidal silica ($SiO_2$); and (iii) a photocatalytic agent optionally wherein the photocatalytic agent comprises ≥70 wt % anatase titanium dioxide ($TiO_2$) having an average particle size ("aps") ≤100 nm.

The first coating or first mixture preferably has an average thermal emissivity coefficient E≥0.90 across the infrared spectrum 2.5-30.0 μm and optionally has an average solar reflectivity coefficient R≥0.90 and/or an average solar absorptivity coefficient A≤0.10 across the solar spectrum 0.3-2.5 μm.

According to an aspect of the present invention there is provided a method of retro-fitting an overhead power transmission or distribution line comprising one or more electrical conductors, the method comprising:

spraying, painting, coating or applying a first coating or first mixture on to at least a portion of one or more electrical conductors, wherein the first coating or first mixture comprises:

(i) an inorganic binder optionally comprising an alkali metal silicate; (ii) a polymerisation agent optionally comprising nanosilica ("nS") or colloidal silica ($SiO_2$); and (iii) a photocatalytic agent optionally wherein the photocatalytic agent comprises ≥70 wt % anatase titanium dioxide ($TiO_2$) having an average particle size ("aps") ≤100 nm.

Preferably, the first coating or first mixture has an average thermal emissivity coefficient E≥0.90 across the infrared spectrum 2.5-30.0 μm and optionally has an average solar reflectivity coefficient R≥0.90 and/or an average solar absorptivity coefficient A≤0.10 across the solar spectrum 0.3-2.5 μm.

According to various embodiments the first coating or first mixture may have an average thermal emissivity coefficient E in the range 0.90-0.91, 0.91-0.92, 0.92-0.93, 0.93-0.94, 0.94-0.95, 0.95-0.96, 0.96-0.97, 0.97-0.98, 0.98-0.99 or 0.99-1.00 across the infrared spectrum 2.5-30.0 μm.

According to various embodiments the first coating or first mixture may have an average solar reflectivity coefficient R in the range 0.90-0.91, 0.91-0.92, 0.92-0.93, 0.93-0.94, 0.94-0.95, 0.95-0.96, 0.96-0.97, 0.97-0.98, 0.98-0.99 or 0.99-1.00 and/or an average solar absorptivity coefficient A in the range 0.00-0.01, 0.01-0.02, 0.02-0.03, 0.03-0.04, 0.04-0.05, 0.05-0.06, 0.06-0.07, 0.07-0.08, 0.08-0.09 or 0.09-0.10 across the solar spectrum 0.3-2.5 μm.

BRIEF DESCRIPTION OF THE DRAWINGS

Various embodiments of the present invention together with other arrangements given for illustrative purposes will now be described, by way of example only, and with reference to the accompanying drawings in which.

DETAILED DESCRIPTION

Various embodiments of the present invention together with conventional arrangements given for illustrative purposes will now be discussed in more detail.

Figure 1:
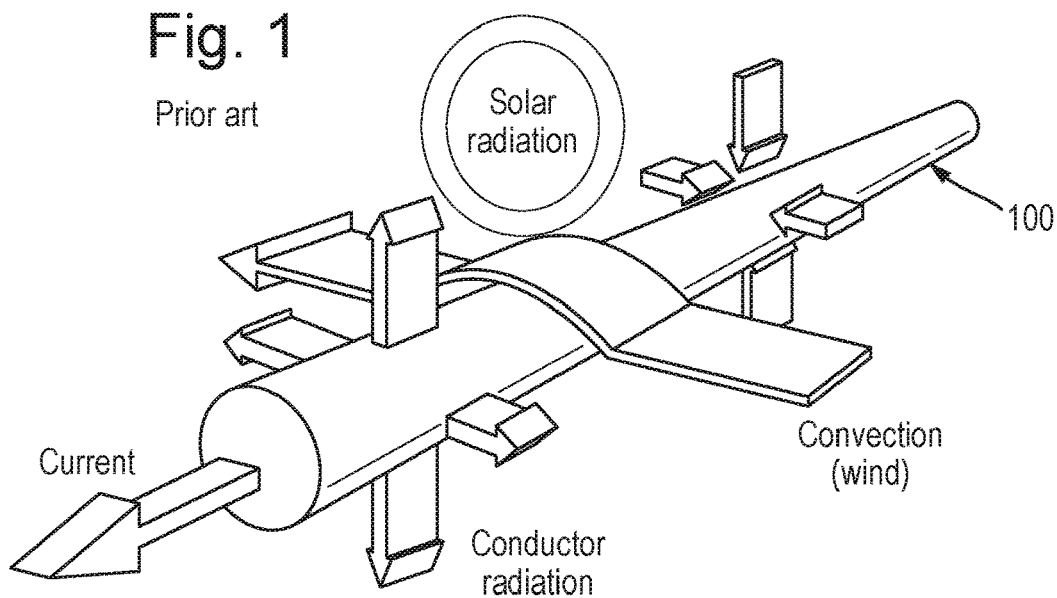
FIG. 1 illustrates some of the heat transfer mechanisms associated with an overhead electrical conductor including gaining energy by solar radiation and losing energy by conductor radiation and by convection (wind)

FIG. 1 illustrates some of the heat transfer mechanisms associated with an overhead conductor 100.

There are two predominate heat transfer mechanisms which will cause the temperature of the conductor 100 to rise. The first heat transfer mechanism is solar radiative heating of the conductor 100. It will be understood that incident solar radiation upon the conductor 100 will result in the temperature of the electrical conductor 100 increasing.

The second heat transfer mechanism (not shown in FIG. 1) which will cause the temperature of the conductor 100 to rise is the effect of Ohmic losses due to the transmission of electrical current through the conductor 100. The resistance of the conductor 100 to the transmission of electrical current through the conductor 100 will result in Joule heating of the conductor 100.

Accordingly, the combined effect of solar radiative heating of the conductor 100 and Joule heating will cause the temperature of the conductor 100 to rise.

The gain in energy of the conductor 100 may be offset by three thermal transfer mechanisms through which the conductor 100 may lose energy namely by radiation, conduction and convection.

Heat loss by conduction is negligible. Heat loss by convection (i.e. due to air currents or wind) will be dependent upon the geographic location of the conductor 100. A conductor 100 may be deployed in a hot region of the world such as Southern USA, the Middle East or Australia. Winds in non-coastal regions may be relatively light and hence heat loss by convection may not normally be a significant consideration. Accordingly, the predominant mechanism by which a conductor 100 may lose energy is by thermal radiation.

It will be understood by those skilled in the art that overhead bare conductors as are conventionally deployed in regions of the world such as Southern USA, the Middle East and Australia can reach significantly elevated temperatures. Accordingly, the issue of being able to reduce the operational temperature of an overhead conductor deployed in a region of the world such as Southern USA, the Middle East and Australia is of considerably commercial concern to e.g. utilities companies.

High voltage power lines in many countries are considered to form part of the national infrastructure and hence may be state owned and controlled.

Overhead electricity transmission lines generally comprise a core formed of one or more conductive wires. Various different types of overhead conductors are known.

All Aluminium Conductors ("AAC") comprise hard drawn aluminium wires stranded in successive layers in opposite directions to form the conductor as per BS EN 50182 or IEC 61089. AAC conductors may be used for aerial distribution lines having relatively short spans, aerial feeders and bus bars of substations. AAC conductors have a high corrosion resistance since steel is not present. Conventional AAC conductors are typically rated up to a maximum operating temperature of 80° C.

All Aluminium Alloy Conductors ("AAAC") comprise All Aluminium Alloy ("ALMELEC") wires stranded in successive layers in opposite directions to form the conductor as per IEC 61089, BS EN 50182 or ASTM B 399. AAAC conductors are mainly used for overhead lines in transmission and distribution electrical networks having relatively long spans. They are also used as a messenger to support overhead electrical cables. AAAC conductors have a high corrosion resistance since steel is not present. Conventional AAAC conductors are typically rated up to a maximum operating temperature of 80° C.

Aluminium Conductor Steel Reinforced ("ACSR") conductors comprise an outer layer of aluminium conductor concentrically stranded over a central core of galvanized or stranded steel wires to form the conductor as per BS EN 50182, ASTM B 232 or IEC 61089. ACSR conductors are widely used for electrical power transmission over long distances. ACSR conductors may also be used as a messenger for supporting overhead electrical cables. Conventional ACSR conductors are typically rated up to a maximum operating temperature of 80° C.

Aluminium Conductor Aluminium Clad Steel Reinforced ("ACSR/AW") conductors comprise an outer layer of aluminium conductor concentrically stranded over a central core of aluminium clad steel solid or stranded cable to form the conductor as per ASTM B 549. ACSR/AW conductors are used for electrical power transmission and are ideal for long overhead lines spans like ACSR conductors but with slightly better resistance and current carrying capacity in addition to good corrosion resistance. Conventional ACSR/AW conductors are typically rated up to a maximum operating temperature of 80° C.

Areal Bundled Cables ("ABC") are made from aluminium conductors which are insulated by XLPE insulation and assembled to form two (Duplex), three (Triplex), four (Quadruplex) or more conductors as per ICEA S 474-76 or BS EN 50182. They are used for secondary overhead lines (in circuits not exceeding 600 V phase to phase) on poles or as feeders to residential premises.

Various High Temperature Low Sag ("HTLS") conductors are also known which are designed to operate at significantly higher operational temperatures of up to 150-250° C.

Known HTLS conductors include Aluminium Conductor Composite Core ("ACCC") conductors, Aluminium Conductor Steel Supported ("ACSS/MA") conductors, Aluminium Conductor Aluminium Clad Steel Supported ("ACSS/AW") conductors, Thermal Resistant Aluminium Alloy Conductor Steel Reinforced ("TACSR") conductors, Thermal Resistant Aluminium Alloy Conductor Aluminium Clad Steel Reinforced ("TACSR/AW") conductors and Super Thermal Resistant Aluminium Alloy Conductor Aluminium Clad Invar Reinforced ("STACIR/AW") conductors.

Aluminium Conductor Composite Core ("ACCC") conductors comprise a concentrically stranded conductor with one or more layers of trapezoidal shaped annealed 1350-O aluminium wires on a central core of light weight carbon-glass fibre composite. ACCC conductors comprising a hybrid carbon composite core are stronger and lighter than traditional steel cores. ACCC conductors are capable of carrying twice the current of traditional ACSR conductors as ACCC conductors are designed for continuous operating temperatures of up to 180° C. in addition to its lighter core which allows approx. 30% more aluminium to be used without increasing the total weight. Usage of ACCC conductors reduces line losses by 30-40% under equal load conditions compared with traditional ACSR conductors of the same diameter and weight. ACCC conductors have greater strength, effective self-damping, superior fatigue resistance and a low coefficient of expansion thereby reducing conductor sag under heavy electrical load conditions. As a result, ACCC conductors can be used to increase spans between fewer or shorter structures. ACCC conductors have greater corrosion resistance than traditional ACSR conductors.

ACCC conductors are used for overhead distribution and transmission lines and are particularly useful in reconductoring applications requiring increased current with existing tensions and clearances, new line applications where structures can be economised due to reduced conductor sag, new line applications requiring high emergency loading and lines where vibration due to wind is a problem. ACCC conductors can also be used at corrosive and coastal environments due to their good corrosion resistance. Conventional ACCC conductors are typically rated up to a maximum operating temperature of 180° C.

Aluminium Conductor Steel Supported ("ACSS/MA") conductors comprise one or more layers of annealed aluminium 1350-O wires stranded over a central core of zinc-5% aluminium mischmetal alloy coated steel wires that are designed to withstand most or all of the mechanical load on the ACSS conductor. ACSS conductors may be manufactured according to ASTM B 856.

ACSS/MA conductors are similar to traditional ACSR conductors except that ACSS/MA conductors can be operated continuously at high temperatures up to 250° C. without damage. ACSS/MA conductors sag less under emergency loading than ACSR conductors, have self-damping properties and final sag is not affected by long time creep of the aluminium.

ACSS/MA conductors are used for overhead distribution and transmission lines and are particularly useful in reconductoring applications requiring increased current with existing tensions and clearances. ACSS/MA conductors are also used for new line applications where structures can be economised due to reduced conductor sag, new line applications requiring high emergency loadings and lines where vibration due to wind is a problem. Conventional ACSS/MA conductors are typically rated up to a maximum operating temperature of 250° C.

Aluminium Conductor Aluminium Clad Steel Supported ("ACSS/AW") conductors comprise one or more layers of annealed aluminium 1350-O wires stranded over a central core of aluminium clad steel wires that are designed to withstand most or all of the mechanical load on ACSS/AW conductors. ACSS/AW conductors may be manufactured according to ASTM B 856.

ACSS/AW conductors can operate continuously at high temperatures up to 200° C. without damage. The aluminium clad steel core which consists of a thick layer of aluminium (approx. 10% of the nominal wire radius) over steel gives ACSS/AW conductors the advantages of ACSS conductors along with light weight and good conductivity of aluminium with the high tensile strength and ruggedness of steel.

ACSS/AW conductors are used for overhead distribution and transmission lines and are especially useful in reconductoring applications requiring increased current with existing tensions and clearances. ACSS/AW conductors are also used for new line applications where structures can be economised due to reduced conductor sag, new line applications requiring high emergency loadings and lines where vibration due to wind is a problem.

ACSS/AW conductors have strength characteristics similar to ACSS conductors along with slightly greater ampacity and resistance to corrosion due to aluminium cladding of the steel core wires. Conventional ACSS/AW conductors are typically rated up to a maximum operating temperature of 200° C.

Thermal Resistant Aluminium Alloy Conductor Steel Reinforced ("TACSR") conductors comprise one or more layers of thermal resistant aluminium zirconium alloy (AT1) wires stranded over a central core of zinc coated steel wire(s) as per IEC 62004 and IEC 60888 and generally according to IEC 61089.

TACSR conductors are able to carry higher (150%) load current than traditional ACSR conductors as they are designed for continuous operating temperatures of up to 150° C. TACSR conductors have the same installation technique as ACSR conductors.

TACSR conductors are used for overhead distribution and transmission lines and are particularly useful in new line applications requiring increased current. Conventional TACSR conductors are typically rated up to a maximum operating temperature of 150° C.

Thermal Resistant Aluminium Alloy Conductor Aluminium Clad Steel Reinforced ("TACSR/AW") conductors comprise one or more layers of thermal resistant aluminium zirconium alloy (AT1) wires stranded over a central core of stranded aluminium clad steel (20SA Type A) wire(s) as per IEC 62004 and IEC 61232 and generally according to IEC 61089.

TACSR/AW conductors are able to carry higher load current than traditional ACSR conductors as they are designed for continuous operating temperatures of up to 150° C. TACSR/AW conductors have increased corrosion resistance and lower electrical resistance and lower mass than TACSR conductors. TACSR/AW conductors have the same installation technique as ACSR conductors.

TACSR/AW conductors are used for overhead distribution and transmission lines and are particularly useful in new line applications requiring increased current. TACSR/AW may be used at corrosive and coastal environments due to their good corrosion resistance. Conventional TACSR/AW conductors are typically rated up to a maximum operating temperature of 150° C.

Super Thermal Resistant Aluminium Alloy Conductor Aluminium Clad Invar Reinforced ("STACIR/AW") conductors comprise one or more layers of super thermal resistant aluminium zirconium alloy (AT3) wires stranded over a central core of stranded aluminium clad invar wires as per IEC 62004 and generally according to IEC 61089 and IEC 61232. Invar is a special Fe/Ni alloy having a very low coefficient of linear expansion.

STACIR/AW conductors are able to carry higher (200%) load current than traditional ACSR conductors as they are designed for continuous operating temperatures of up to 210° C. Beyond knee point STACIR/AW conductors experience a sag increase due to the expansion of the Invar core alone (extremely low value $\leq 3.7 \times 10^{-6}/°$ C.) which controls sag at high operating temperatures. STACIR/AW conductors have increased corrosion resistance and have the same installation technique as ACSR conductors.

STACIR/AW conductors are used for overhead distribution and transmission lines and are particularly useful in new line applications requiring increased current. STACIR/AW conductors may be used at corrosive and coastal environments due to their good corrosion resistance. Conventional STACIR/AW conductors are typically rated up to a maximum operating temperature of 210° C.

Accordingly, known HTLS conductors enable high voltage overhead electric conductors to be operated at significantly higher operating temperatures up to a maximum operating temperature typically in the range 150-250° C.

Figure 2A:
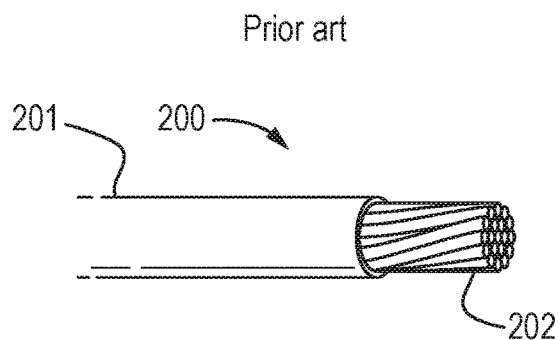
FIG. 2A shows a side view of a known coated conductor and FIG. 2B shows a cross-sectional view of the known coated conductor.
Figure 2B:
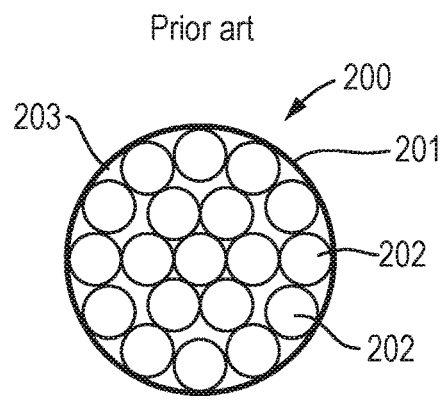

FIG. 2A shows a side view and FIG. 2B shows a cross-sectional view of a known coated conductor 200 as disclosed in WO 2015/105972 (Ranganathan). The known conductor 200 comprises 19 aluminium cables or wires 202 surrounded by an outer polymeric coating 201. Gaps 203 may be present between the outer polymeric coating 201 and the individual conductive cables or wires 202. The outer polymeric coating 201 is provided in order to decrease the temperature of the conductor 200 when the conductor 200 is tested in accordance with ANSI C119.4.

Figure 3A:
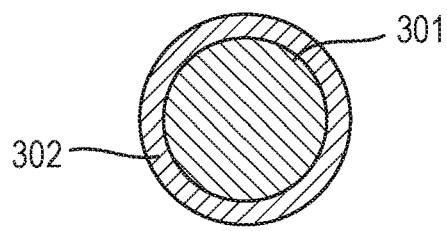
FIG. 3A shows a cross-sectional view of a known single coated conductor.

FIG. 3A shows a cross-sectional view of another known conductor having a central aluminium core 301 and a single outer polymeric coating 302.

Figure 3B:
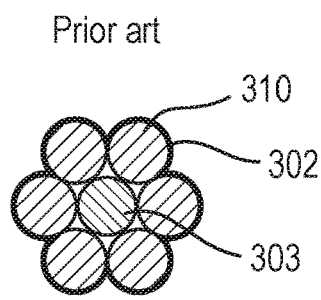
FIG. 3B shows a cross-sectional view of a known 6/1 ACSR conductor with a coating.

FIG. 3B shows a cross-sectional view of a known 6/1 ACSR conductor comprising a central steel reinforcing element 303 surrounded by a ring of six aluminium electrical wires 310. Each of the six aluminium wires 310 has a polymeric coating 302.

Figure 3C:
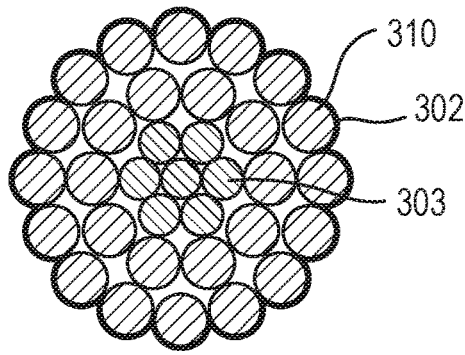
FIG. 3C shows a cross-sectional view of a known 26/7 ACSR conductor with a coating and FIG. 3D shows a cross-sectional view of a known 54/19 ACSR conductor with a coating.

FIG. 3C shows a cross-sectional view of a known 26/7 ACSR conductor comprising seven central steel reinforcing elements 303 surrounded by a first ring of aluminium wires 310 which in turn are surrounded by a second ring of aluminium wires 310. The second outer ring of aluminium wires are enclosed by an outermost polymeric coating 302.

Figure 3D:
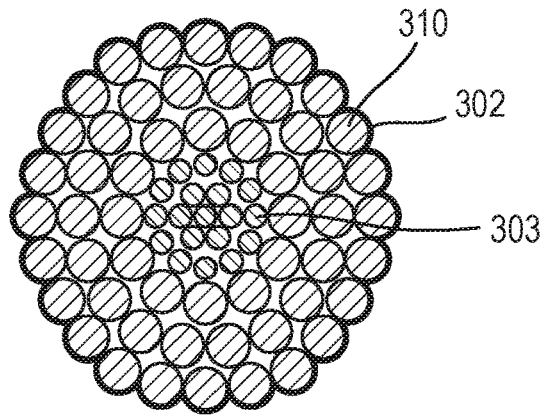

FIG. 3D shows a known 54/19 ACSR conductor comprising 19 central steel reinforcing elements 303 surrounded by a first ring of aluminium wires 310 which are in turn surrounded by a second ring of aluminium wires 310. The second ring of aluminium wires 310 are in turn surrounded by a third ring of aluminium wires 310. The third outer ring of aluminium wires 310 is enclosed by an outermost polymeric coating 302.

Figure 4:
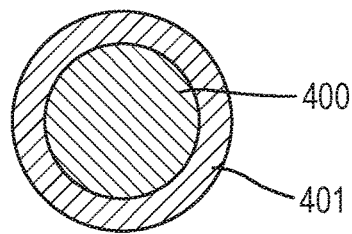
FIG. 4 shows a single coated conductor according to a preferred embodiment of the present invention.

FIG. 4 shows a single coated conductor according to a preferred embodiment of the present invention. The single coated conductor comprises an inner metallic conductor 400 preferably of aluminium. The inner metallic conductor 400 may comprise one or more steel reinforcing elements (not shown) and/or one or more composite elements.

The single coated conductor according to a preferred embodiment of the present invention preferably comprises a first inorganic coating 401 surrounding the metallic conductor 400. The first coating 401 includes a self-cleaning photocatalytic agent comprising anatase titanium dioxide ($TiO_2$).

According to the present invention one or more electrical conductors 400 are provided which have a first coating or layer 401 which has an average thermal emissivity coefficient E≥0.90 and an average solar reflectivity coefficient R≥0.90 and/or an average solar absorptivity coefficient A≤0.10.

The one more electrical conductors 400 may form part of an overhead power transmission or distribution line.

The first coating or layer 401 preferably comprises: (i) an inorganic binder optionally comprising an alkali metal silicate; (ii) a polymerisation agent optionally comprising nano-silica ("nS") or colloidal silica ($SiO_2$); (iii) optionally a reflective agent such as rutile titanium dioxide ($TiO_2$) having an average particle size ≥250 nm; and (iv) a photocatalytic agent, wherein the photocatalytic agent optionally comprises ≥70 wt % anatase titanium dioxide ($TiO_2$) optionally having an average particle size ≤100 nm.

The first coating or layer 401 preferably has an average thermal emissivity coefficient E≥0.90 across at least 10%, 20%, 30%, 40%, 50%, 60%, 70%, 80% or 90% of the infrared spectrum 2.5-30.0 μm.

The first coating or layer 401 preferably has an average solar reflectivity coefficient R≥0.90 and/or an average solar absorptivity coefficient A≤0.10 across at least 10%, 20%, 30%, 40%, 50%, 60%, 70%, 80% or 90% of the solar spectrum 0.3-2.5 μm.

According to an embodiment the first coating 401 may be provided on at least a portion of the one or more electrical conductors 400.

A single coated conductor according to the present invention has been tested and found to have a good or excellent corrosion resistance when tested in accordance with ASTM B117 (Salt spray) testing procedure.

Using the industry standard CIGRE 207-2002 method of calculating conductor temperature the importance of utilising a single coated conductor having a high solar reflectivity coating in regions with high solar radiation will now be demonstrated. For illustrative purposes only, a power line may be considered which is deployed at a location 30° North in latitude and which is exposed to 12 hours of August solar radiation. The air temperature is modelled as being 40° C.

Under the above conditions a Drake ACSR overhead electrical conductor with different coatings transmitting a constant current of 1000 A will have the following characteristics:

TABLE 1

| Optical characteristics | Conductor temperature (° C.) | Conductor resistance Ohms/km |
|---|---|---|
| Uncoated conductor<br>Emissivity: 0.5<br>Absorptivity: 0.5<br>Reflectivity: 0.5 | 99.1 | 0.0945 |
| Conductor having a grey emissive coating<br>Emissivity: 0.86<br>Absorptivity: 0.55<br>Reflectivity: 0.45 | 91.1 | 0.0921 |
| A single coated conductor according to a preferred embodiment of the present invention having both high emissivity and high reflectivity<br>Emissivity: 0.95<br>Absorptivity: 0.1<br>Reflectivity: 0.9 | 83.3 | 0.0898 |

The figures shown above in Table 1 were calculated using the industry standard CIGRE model and demonstrate that a single coated conductor according to a preferred embodiment of the present invention having both high reflectivity and high emissivity results in nearly a doubling of the cooling effect (×1.975 15.8° C. c.f. 8.0° C.) relative to a conventional conductor having a grey coating. As detailed below, the above calculations were further confirmed through empirical testing using two different test rigs.

A single coated conductor according to a preferred embodiment of the present invention having both an increased emissivity and at the same time a high reflectivity (i.e. without increasing solar absorption) is shown to be particularly effective and to provide a significantly improved performance relative to conventional arrangements operating at temperatures up to 100° C. (as per Table 1 above) and also at elevated temperatures in the range 150-250° C. (data shown below).

The first coating 401 may comprise a white filler. The white filler may, for example, comprise: (i) magnesium oxide (MgO); (ii) calcium oxide (CaO); (iii) aluminium oxide ($Al_2O_3$); (iv) zinc oxide (ZnO); (v) calcium carbonate ($CaCO_3$); (vi) aluminium silicate ($Al_2SiO_5$); (vii) kaolin ($Al_2O_3.2SiO_2$); (viii) titanium dioxide ($TiO_2$); or (viii) barium sulphate ($BaSO_4$). The first coating 401 may include one or more other white fillers.

Inorganic Coatings

According to various embodiments the first coating 401 preferably comprises an inorganic binder, preferably a water based inorganic binder.

The inorganic binder preferably comprises an alkali (or alkaline) metal silicate. For example, the alkali (or alkaline) metal silicate may comprise potassium silicate ($K_2SiO_3$). Alternatively, the alkali (or alkaline) metal silicate may comprise sodium silicate. The sodium silicate may comprise sodium metasilicate ($Na_2SiO_3$), sodium orthosilicate ($Na_4SiO_4$) or sodium pyrosilicate ($Na_6Si_2O_7$).

According to an embodiment the alkali (or alkaline) metal silicate may comprise lithium silicate ($Li_2SiO_3$).

According to another embodiment the alkali (or alkaline) metal silicate may comprise calcium silicate ($Ca_2SiO_4$) or calcium orthosilicate.

According to another embodiment the alkali (or alkaline) metal silicate may comprise magnesium aluminium silicate ($AlMgSiO_4$).

The first inorganic coating 401 may comprise one or more braids, ceramic fibres, adhesives yarns or special tapes.

The first inorganic coating 401 may be semi-conductive and may have a volume resistivity of $10^{12}$ ohm-cm or less, preferably a volume resistivity of $10^{10}$ ohm-cm or less, further preferably a volume resistivity of $10^8$ ohm-cm or less.

The first inorganic coating 401 may have a thermal deformation temperature in the range 140-150° C., 150-160° C., 160-170° C., 170-180° C., 180-190° C., 190-200° C., 200-210° C., 210-220° C., 220-230° C., 230-240° C., 240-250° C., 250-260° C., 260-270° C., 270-280° C., 280-290° C., 290-300° C. or >300° C.

The first inorganic coating 401 may have a retention of elongation at break of 50% or more after 2000 hours of exterior weathering test in accordance with ASTM 1960.

The first inorganic coating 401 may have a heat conductivity of 0.15 W/m or more.

The first coating 401 may less preferably have a lightness value L* in the range 0-10, 10-20, 20-30, 30-40, 40-50, 50-60, 60-70, 70-80. More preferably, the first coating 401 is white and has a lightness value L* in the range 80-90 or 90-100 wherein when L*=0 the observed colour is black and wherein when L*=100 the observed colour is white. According to the preferred embodiment the coating 401 has a L*≥80.

The first inorganic coating 401 may be substantially free of hydrorepellent additives, a hydrophilic additive and/or a dielectric fluid.

Fillers

In a similar manner to the arrangements disclosed in WO 2015/105972 (Ranganathan) according to various embodiments of the present invention the first inorganic coating 401 may include one or more fillers. The first inorganic coating 401 may contain one or more fillers at a concentration of 0-50% (by weight of the total composition) and the one or more fillers may have an average particle size of 0.1-50 µm. The filler particles may be spherical, hexagonal, flake like, fibres or ribbon like.

IR Reflective Additives

In a similar manner to the arrangements disclosed in WO 2015/105972 (Ranganathan) according to various preferred embodiments of the present invention, the first inorganic coating 401 may comprise one or more infrared reflective pigments or additives. The one or more infrared reflective ("IR") pigments or additives may be included in the first inorganic coating 401 at a concentration from e.g. 0.1-10 wt %. The IR reflective additives are preferably white.

Stabilisers

In a similar manner to the arrangements disclosed in WO 2015/105972 (Ranganathan) according to various preferred embodiments of the present invention one or more stabilisers may be included in the first inorganic coating 401 at a concentration of e.g. 0.1-5% (by weight of the total composition or coating).

The one or more stabilisers may comprise a light stabiliser and/or a dispersion stabiliser such as bentonite. The stabiliser is preferably white.

Coating Process

The first inorganic coating 401 or a first mixture may be applied to one or more conductors 400 such as an overhead cable by being sprayed or painted on. The first coating or first mixture is preferably water based and may be dehydrated or dried e.g. by thermal curing optionally over a period of hours.

One or more pre-treatment processes may be used to prepare a surface of the conductor 400 or one or more conductive wires for the first inorganic coating 401. For example, according to various embodiments the conductor 400 or one or more conductive wires may be subjected to chemical treatment, pressurised air cleaning, hot water treatment, steam cleaning, brush cleaning, heat treatment, sand blasting, ultrasound, deglaring, solvent wipe, plasma treatment and the like.

A surface of one or more overhead conductors 400 may be deglared by sand blasting. An overhead conductor may be heated to temperatures between 23-250° C. as part of a heat treatment process to prepare the surface of the conductor 400 or one or more conductive wires for the first coating 401. The temperature may be selected dependent upon the first coating 401.

In certain embodiments, the coating processes may be solvent free or essentially solvent free. Solvent free, or essentially solvent free may mean that no more than about 1% of a solvent is used in any of the processes relative to the total weight of the product.

Characteristics of Coated Conductors

As will be appreciated, the application of a single coating or monolayer 401 provides cables, such as overhead conductors, with a number of superior characteristics including self-cleaning properties.

The first inorganic coating 401 may provide a cable with a uniform thickness around the exterior of the conductor 400 or one or more conductive wires. Each method of applying the first inorganic coating 401 may compensate for differing amounts of unevenness.

The first coating layer 401 according to various preferred embodiments of the present invention may provide the conductor 400 or one or more conductive wires with an increased mechanical strength relative to that of a bare conductor. For example, according to various embodiments a single coated conductor 400 or one or more conductive wires may have a minimum tensile strength of 10 MPa and may have a minimum elongation at break of 50% or more.

As another advantage, a single coating 401 may in a similar manner to the arrangements disclosed in WO 2015/105972 (Ranganathan) serve as a protective layer against corrosion and bird caging in the conductor 400 or one or more conductive wires.

As may be appreciated, bare or liquid coated conductors may lose their structural integrity over time and may become vulnerable to bird caging in any spaces between the conductor wire strands. In contrast, a conductor 400 or one or more conductive wires having a single coating 401 are shielded and may eliminate bird caging problems.

As another advantage, the first inorganic coating 401 may eliminate water penetration, may reduce ice and dust accumulation and may improve corona resistance.

As another advantage, a conductor 400 or one or more conductive wires coated with a single coating 401 may have an increased heat conductivity, an increased emissivity and decreased absorptivity characteristics.

As an additional advantage, the first inorganic coating 401 may have a thermal deformation resistance at higher temperatures including temperatures of 140-150° C., 150-160° C., 160-170° C., 170-180° C., 180-190° C., 190-200° C., 200-210° C., 210-220° C., 220-230° C., 230-240° C., 240-250° C., 250-260° C., 260-270° C., 270-280° C., 280-290° C., 290-300° C. or >300° C.

Advantageously, the first inorganic coating 401 may maintain flexibility at lower temperatures and may have improved shrink back and low thermal expansion at the lower temperature range.

The addition of the first inorganic coating 401 may add relatively little weight to an overhead conductor 400. For example, the weight increase of a single coated overhead conductor according to a preferred embodiment of the present invention may be <5%, 5-10%, 10-15% or 15-20%.

A yet further significant advantage is that the first inorganic coating 401 have either a good or excellent corrosion resistance in contrast to some known single coatings.

Experimental Data

Various simulations were performed following CIGRE technical specification 601, further details of which are given below.

For steady state situations, fixed weather and conductor parameters were assumed in order to calculate the maximum expected ratings or conductor temperatures. The environmental data were chosen to represent a hot, cloudless, sunny subtropical desert location, as detailed below.

TABLE 2

Environmental data

| Location | 30 Degrees North |
|---|---|
| Date | 10$^{th}$ June |
| Time | 12 hours |
| Ambient temperature (° C.) | 40 |
| Wind velocity perpendicular to conductor (m/s) | 0.6096 |
| Conductor orientation | E-W |

TABLE 2-continued

Environmental data

| Atmospheric conditions | Clear |
|---|---|
| Albedo | 0.1 |
| Calculated solar irradiance (W/m$^2$) | Varied from night to noon |

Reduction in Operating Temperature

Generally, a new uncoated conductor will have an emissivity E=0.5 and solar absorptivity A=0.5. Over the course of a year the emissivity E of an uncoated conductor will increase to e.g. approx. 0.8 as the surface of conductor becomes coated with organic matter and/or is exposed to pollution. Similarly, the absorptivity will also increase during the course of the year to 0.8. These figures are dependent upon location and it will be understood, for example, that if the conductor is located in a less polluted location then the final values may end up being different (e.g. higher/lower).

Table 3 below shows current and temperature as a function of surface characteristics.

TABLE 3

| | Aged uncoated Drake conductor E = 0.8 A = 0.8 | New uncoated Drake conductor E = 0.5 A = 0.5 | Conductor having a preferred coating E = 0.95 A = 0.1 |
|---|---|---|---|
| Current at 100° C. (A) | 907 | 908 | 1126 |
| Temperature (° C.) at 976 Amps | n/a | 99.9 | 78.75 |
| Increase in current | n/a | 1 | 119 |
| I$^2$R power savings (running at a cooler temperature) | n/a | n/a | 6% |

It will be understood that Drake ACSR conductors are commonly used for CIGRE simulations.

Increase in Ampacity

Table 4 below shows how the ampacity varies with time of day and corresponding solar irradiance for a perfect conductor, an aged conductor, a new uncoated conductor and coated conductor according to a preferred embodiment.

TABLE 4

| Time of Day | Total Solar Irradiance (W/m$^2$) | Theoretical perfect Drake conductor (26/7) E = 1.0 A = 0.0 Current (A) | Drake conductor (26/7) after 1 year E = 0.8 A = 0.8 Current (A) | New Drake conductor (26/7) E = 0.5 A = 0.5 Current (A) | Drake conductor (26/7) with a preferred coating E = 0.95 A = 0.1 | | |
|---|---|---|---|---|---|---|---|
| | | | | | Current (A) | % Uplift on E = 0.8 A = 0.8 | % Uplift on E = 0.5 A = 0.5 |
| 04:00:00 | 0 | 1161 | 1115 | 1043 | 1149 | 3% | 10% |
| 05:00:00 | 0 | 1161 | 1115 | 1043 | 1149 | 3% | 10% |
| 06:00:00 | 266 | 1161 | 1078 | 1018 | 1145 | 6% | 12% |
| 07:00:00 | 463 | 1161 | 1044 | 996 | 1141 | 9% | 15% |
| 08:00:00 | 689 | 1161 | 1006 | 971 | 1137 | 13% | 17% |
| 09:00:00 | 911 | 1161 | 967 | 946 | 1133 | 17% | 20% |
| 10:00:00 | 1093 | 1161 | 935 | 926 | 1129 | 21% | 22% |
| 11:00:00 | 1210 | 1161 | 914 | 912 | 1127 | 23% | 24% |
| 12:00:00 | 1251 | 1161 | 907 | 908 | 1126 | 24% | 24% |

Figure 5:
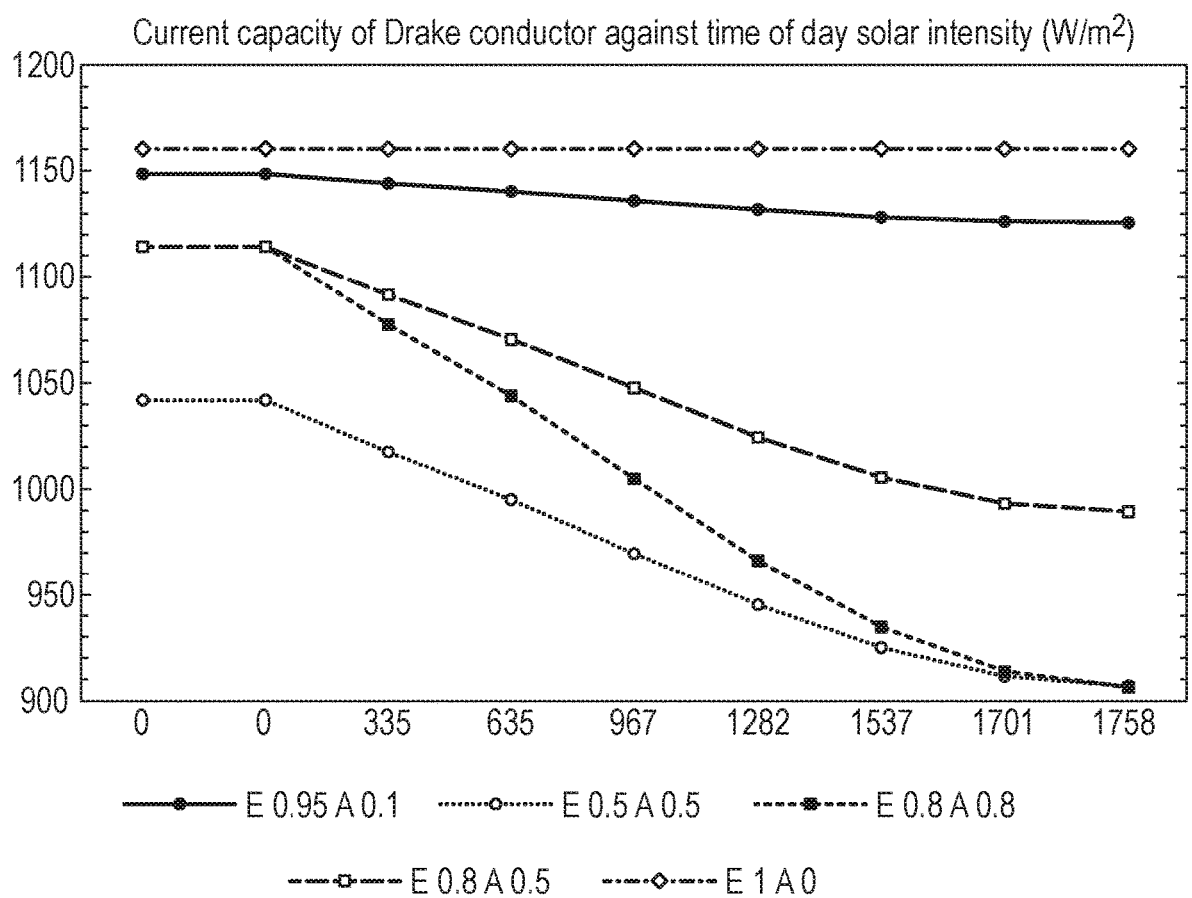
FIG. 5 shows how the ampacity of different types of conductors varies as a function of solar irradiance.

FIG. 5 shows a plot of ampacity or current capacity against time of day solar intensity for a new, aged and dual coated conductor (included for illustrative purposes only) compared against a theoretical perfect conductor.

FIG. 5 shows that the ampacity of a modified conductor performs close to the performance of a theoretical perfect conductor (wherein the ampacity does not reduce with increasing solar irradiance). In particular, it is noted from FIG. 5 that the performance of a modified conductor shows a high level of performance after 8 hours in marked contrast to conventional conductors.

Technology Validation in a Laboratory Environment

Initial lab-scale prototypes were manufactured and tested based on the performance of flat aluminium sheeting of the same grade as power lines but configured flat for ease of testing. Accordingly, coatings were applied to flat sheeting rather than to cylindrical cables.

Optical proof of concept was demonstrated by demonstrating that the first coating 401 has the necessary optical performance (e.g. high reflectivity, high emissivity) in the specific wavelengths required to produce optimal radiative cooling.

Furthermore, electrical proof of concept was demonstrated by demonstrating that a modified conductor operates at a significantly cooler temperature than that of an uncoated conductor when transmitting a relatively high current.

The electrical proof of concept testing involved both: (i) constant current testing wherein multiple flat coated conductors were tested outdoors with their temperatures being the output; and (ii) constant temperature testing involving testing multiple different coatings at the same temperature but with the wattage required to heat each being the output.

Solar Reflective Layer

UV-VIS-NIR spectral analysis of a solar reflective layer was carried out by a third party using a JASCO® V670 UV-VIS-NIR spectrometer with ISN-723 integrating sphere attachment. An integrating sphere attachment allowed collection of diffuse radiation (about 180°) reflected by the sample. Analysis was undertaken in reflectance mode, with specular reflectance excluded. One spectrum was collected from each side of the sample. The sample was also turned 90° around the incident beam for analysis of the second side. This should have low absorbance in the solar spectrum (0.3-2.5 μm). The modified conductor demonstrates this.

Figure 6:
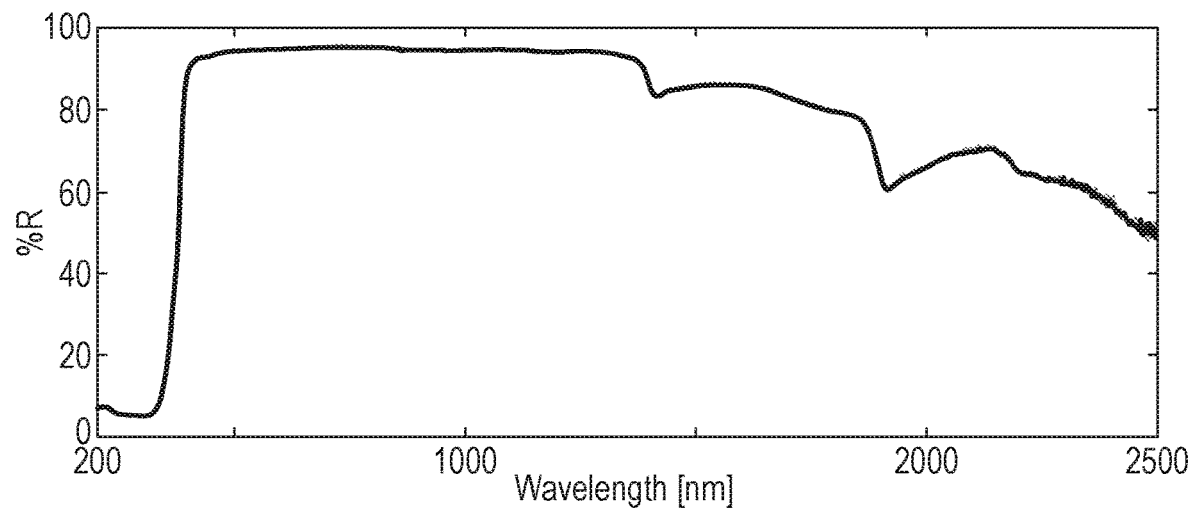
FIG. 6 shows UV-VIS-NIR absorbance spectra of a layer having a high solar reflectance according to an embodiment of the present invention.

FIG. 6 shows UV-VIS-NIR absorbance or reflectivity spectra of a solar reflective layer according to an embodiment of the present invention. The absorbance or reflectivity spectra demonstrates that over 90% of solar energy is not absorbed thereby promoting cooling under direct sunlight. Notably the reflectivity reduces towards 2.5 μm which is advantageous so as not to prevent or interfere with thermal emission of infra-red radiation in the wavelength range 2.5-30.0 μm. The particular solar reflective layer which was tested with reference to FIG. 6 comprised a single layer reflective/emissive silicate coating according to a preferred embodiment.

Figure 7:
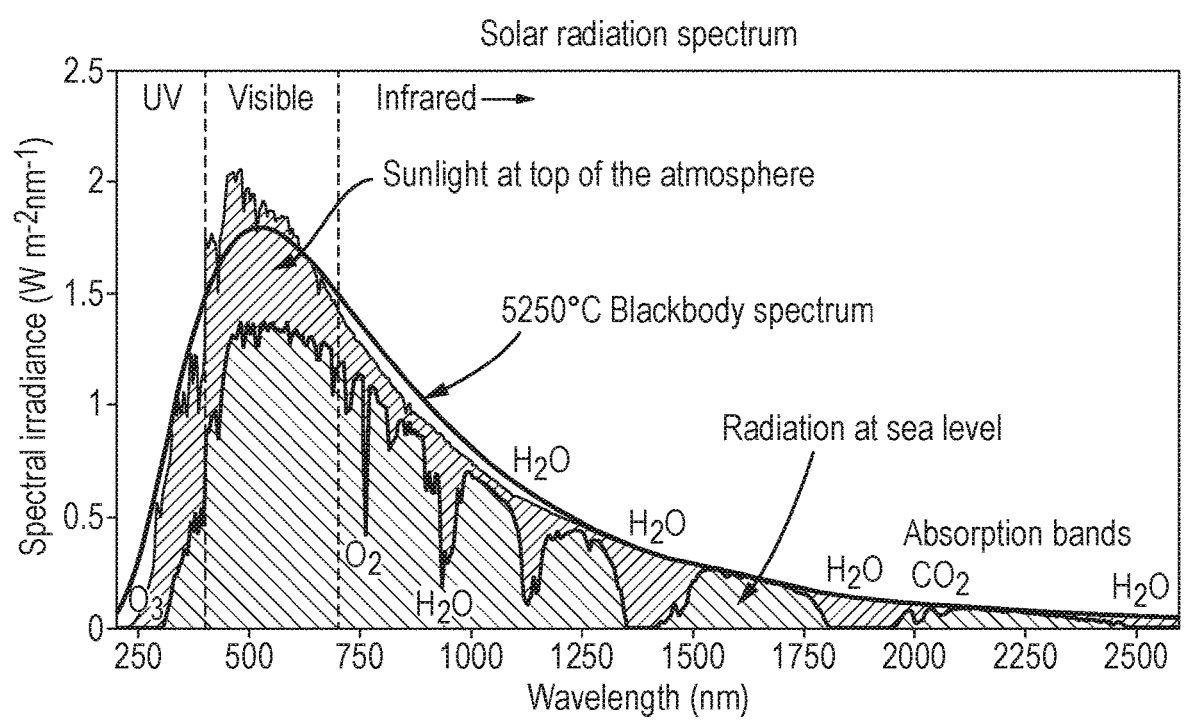
FIG. 7 shows the solar spectrum from 0.3-2.5 μm for comparison purposes with FIG. 6.

FIG. 7 shows the solar spectrum for comparison purposes with FIG. 6. The solar spectrum at the top of the atmosphere broadly corresponds with a 5250° C. blackbody spectrum. The solar radiation at sea level shows various absorption bands due to absorption by $O_2$, $H_2O$ and $CO_2$ molecules.

Constant Current Electrical Proof of Concept

Rig Design and Experimental Method

Further testing was performed in order demonstrate that a modified coating 401 according to a preferred embodiment of the present invention functions to lower the operating temperature of an electrical conductor. A series of conductors comprising several lengths of flat aluminium conductor of allot 1350 were connected in series and tested with at least one of the conductors being uncoated.

The upper surface of each of the conductor(s) was exposed to the atmosphere whilst the lower surface of the conductor(s) was thermally insulated by being adhered to CELOTEX® foam board. DC current was then applied to the conductors which then became hot due to Joule heating. Temperature measurements of the coated and uncoated conductors were taken to demonstrate the efficacy of the single coating 401 according to a preferred embodiment of the present invention in terms of reducing the temperature of an aluminium conductor 400. Sensors were mounted behind the conductors and were located between the conductors and the insulation in order to reduce influences of poor thermal connections which might otherwise introduce errors if they were connected to the side directly exposed to solar radiation.

Several rigs were designed and iteratively optimised in order to remove the possibility of performance measurements being due to artefacts of experimental design. It was desired to explore the performance of different coatings when exposed to sunlight and natural convection, as these environmental conditions represent the operating conditions of the end product.

As no standards exist for constant current testing in an external environment a new purpose built rig was designed specifically for testing outdoors. When testing outdoors and under sunlight and using insulated surface mounted thermocouples to measure temperature a number of problems may arise. Thermocouples may introduce an optical irregularity into the surface of the conductor. Also, a temperature gradient may form from the surface of the conductor to air, where small deviations in the distance from thermocouple to the conductor can lead to large differences in the temperature measuring accuracy between thermocouples.

In turn, a test rig was designed which equally thermally insulated thermocouples and which minimised potential differences in thermal gradients between the sensors and the conductors. A piece of CELOTEX® insulation, with dimensions 50×450×600 mm was used as the base for the test rig.

CELOTEX® has a lower thermal conductivity than air and can operate at the higher temperatures required for the constant current testing. Holes were drilled in the rear of the CELOTEX® insulation and thermocouple sensors were threaded through to the surface. A few millimetres of the sensor cable were then pulled through allowing the sensor to lie parallel to the CELOTEX® surface. Thermocouples sensors were kept electrically insulated from the test strips by a 0.1 mm thick high temperature double sided adhesive tape which was placed on top in order to secure thermocouples to lie within 1 mm of the central line of the conductor. The aluminium conductors were then placed on top of the sensors so that thermocouples were concealed between the CELOTEX® and the aluminium conductor thereby minimising the potential for thermal gradients to exist between the sensors and the conductors. The number of connections between the conductors and the power source was minimised by utilising a single piece of conductor which was cut into a wave-like or serpentine pattern or shape as shown in FIG. 8.

Figure 8:
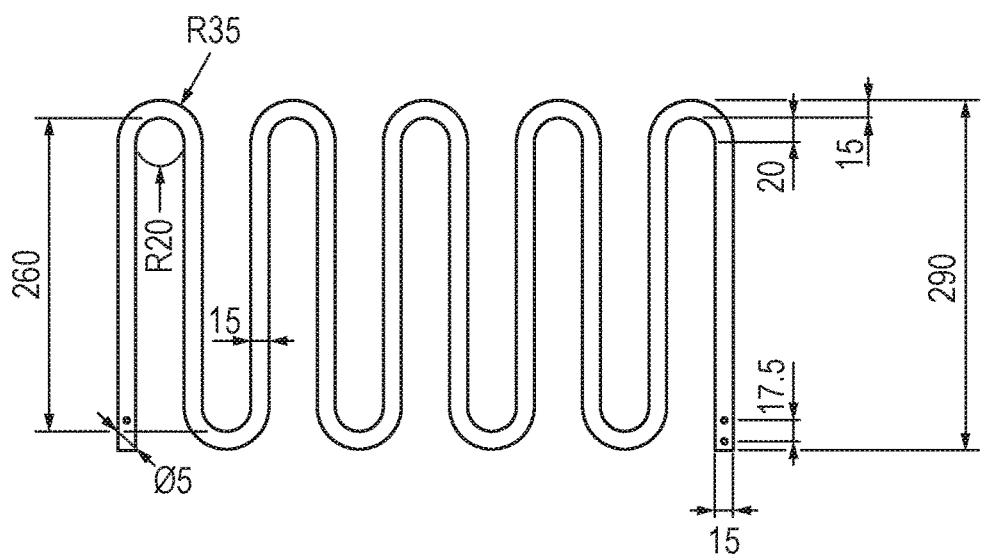
FIG. 8 shows a test aluminium conductor.

FIG. 8 shows an aluminium test conductor with various dimensions indicated. The conductor was arranged to comprise ten rows of which the outer two were used for making electrical connections and the inner eight were for coating testing. The wave-like or serpentine shaped conductor was then placed on top of the sensors and was secured underneath using double sided thermally stable tape. The aluminium conductor comprised alloy 1350 and had a thickness of 0.7 mm. The transition point from one type of coating to another was arranged to be midway through the semi-circular connecting curve portions.

Temperature Testing Up to 100° C.

Four different conductor strips were tested namely: (i) an uncoated bright aluminium (control) conductor; (ii) a conductor having a grey emissive coating comprising 10 wt % silicon carbide in a condensation cured silicone rubber binder; (iii) a conductor having a black emissive coating comprising a carbon black layer comprising 1 wt % carbon black in acetone; and (iv) a conductor 400 according to a preferred embodiment comprising a first or single layer 401 comprising a photocatalytic agent, wherein the photocatalytic agent comprised ≥70 wt % anatase titanium dioxide ($TiO_2$) having an average particle size ("aps") ≤100 nm.

Samples were tested outdoors under low wind conditions with solar radiation levels greater than 800 W/m$^2$. Two nominal temperature ranges were tested. A low voltage DC power supply comprising 1.5 V batteries supplying currents up to 100 A were connected continuously to the test rig which resulted in the conductors increasing in temperature to a temperature of approx. 0-100° C. above ambient. Ambient temperature was typically 20° C. but in the range 10-30° C.

Mean temperatures were calculated for each of the coatings at peak. The key environmental conditions were: (i) 10-30° C. ambient temperature; (ii) low wind (Beaufort scale typically 2-3); and (iii) ≥800 W/m² perpendicular solar irradiation.

Figure 9:
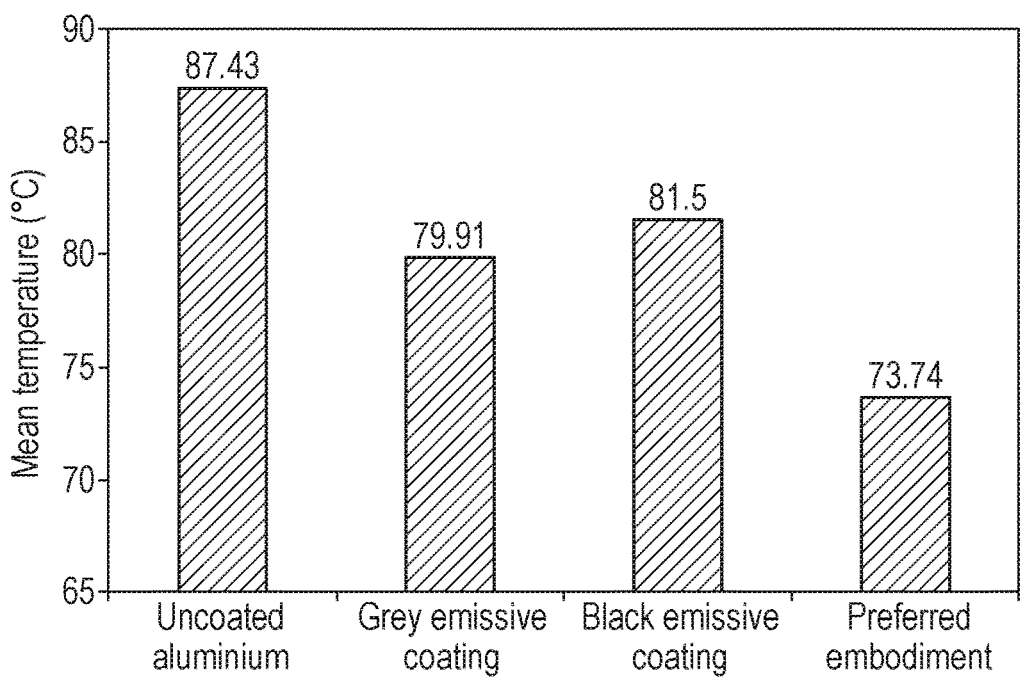
FIG. 9 shows test data relating to the mean temperatures of different test conductors over a peak solar irradiation period.

The results are shown in FIG. 9 which shows the mean temperatures of the different conductors over the peak period. At these temperatures it is apparent that a single coated conductor according to a preferred embodiment of the present invention is particularly advantageous. The empirical test data is consistent with the calculated values shown and described above with reference to Table 1. The test data accordingly demonstrates the significant performance benefits which result from increasing the solar reflectivity in the presence of sunlight by utilising a single coated conductor according to a preferred embodiment of the present invention.

Temperature Testing Up to 250° C.

Three different conductor strips were tested namely: (i) an uncoated bright aluminium (control) conductor; (ii) a conductor having a black emissive coating comprising a carbon black layer comprising 1 wt % carbon black in acetone; (iii) a conductor according to a preferred embodiment having a white coating which includes a photocatalytic agent, wherein the photocatalytic agent comprises ≥70 wt % anatase titanium dioxide ($TiO_2$) having an average particle size s 100 nm.

Samples were tested outdoors under low wind conditions. A 6V lead acid battery with 70 AH nominal capacity was used. The battery was shorted with jump leads in order to heat the strip up to around 250° C. The current was set between 100-150 A and was connected continuously to the test rig which resulted in the conductors increasing in temperature such that the uncoated control conductor reached an average temperature of 249.5° C.

Mean temperatures were calculated for each of the coatings at peak.

Figure 10:
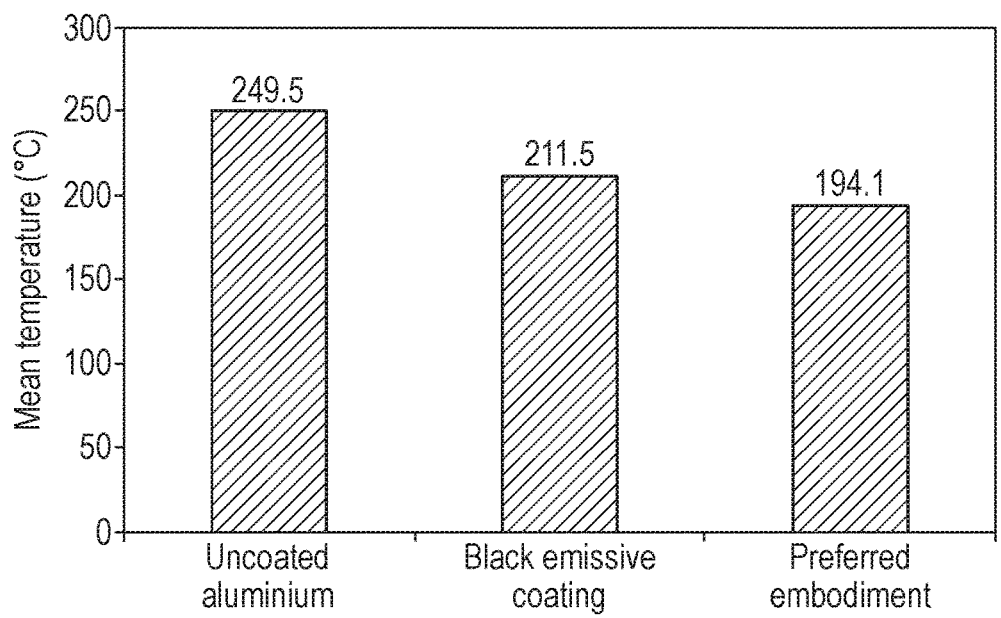
FIG. 10 shows test data relating to the mean temperatures of different test conductors over a peak solar irradiation period and illustrates the significantly improved performance of a single coated conductor according to a preferred embodiment of the present invention operating at elevated temperatures up to 250° C.
Figure 11:
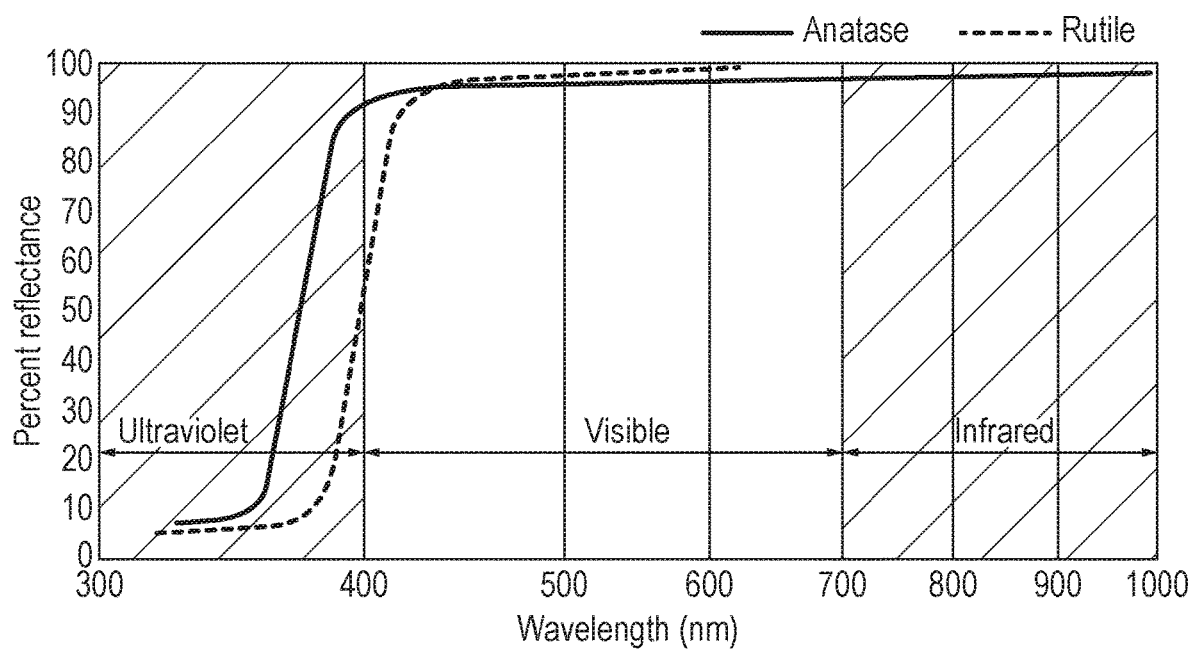
FIG. 11 shows the reflectance of anatase and rutile titanium dioxide ($TiO_2$) pigments as a function of wavelength.

The results are shown in FIG. 10 which shows the mean temperatures of the different conductors over the peak period. At these elevated temperatures it is again apparent that a single coated conductor according to a preferred embodiment of the present invention is particularly advantageous. In particular, the test results show that compared to the control conductor, the single coated provides a temperature reducing effect of 55.4° C. which represent a very significant performance advantage.

Self-Cleaning Photonic Coatings to Increase the Capacity of Overhead Conductors

The present invention is particularly concerned with the inclusion of a photocatalytic agent in the coating 401 provided on an overhead conductor 400 in order to render the coating self-cleaning. In particular, it should be understood that the coating is self-cleaning in the sense that when the photocatalytic agent is excited with ultra-violet ("UV") light then the photocatalytic agent preferably creates hydroxyl ($OH^-$) and superoxide ($O_2^-$) radicals which preferably decompose surface organic matter which may have accreted onto the overhead conductor into carbon dioxide ($CO_2$) and water ($H_2O$).

The coating 401 provided on the overhead conductor 400 according to the preferred embodiment is preferably white (or less preferably may be considered as having a high degree of whiteness). According to the preferred embodiment white may be defined as $L^* \geq 80$.

Two particularly preferred embodiments will now be discussed in more detail below namely: (i) a single inorganic layer 401 formed from a two-part kit; and (ii) a single inorganic layer 401 formed from a one part kit.

Surface modification has emerged recently as a cost effective method to increase the performance of overhead conductors. These work by optimising the external surface of the overhead conductor in terms of its solar reflectivity and thermal emissivity. Having high values (e.g. ≥0.9) for both solar reflectivity (R) and thermal emissivity (E) promotes a significant cooling effect on overhead conductors. This reduction in operating temperature reduces the resistance of the conductor and increases the current carrying capacity.

Several coating based solutions have been proposed to achieve this. For example, various inorganic and organic based coatings are known to lower the operating temperature of overhead lines.

However, the known coatings are predominantly non-white. Furthermore, a known problem with white conductors is that they suffer from discoloration over time.

It will be appreciated by those skilled in the art that conventional single layer (or monolayer) white coating products will accrete dirt and invariably darken over time as they are exposed to environmental pollutants.

As such, there is a particular emphasis in conventional arrangements in promoting thermal emissivity which in turn increases the solar absorptivity. As overhead conductors may operate above 90° C., this approach does result in a net cooling effect.

However, according to the present invention the solar reflectivity (R) is also maximised which advantageously can increase the cooling power.

Thus, substantial performance benefits exist by providing both a highly reflective and a highly emissive coating for a conductor in a manner according to various embodiments of the present invention.

In contrast, conventional arrangements such as those disclosed, for example, in FR-2971617 (Nexan) and WO 2007/034248 (Simic) are considered to be ineffective from a commercial perspective due to the propensity for white coatings to darken and discolour over time.

The progressive darkening of initially white coatings over a period of time makes conventional white coatings preclusive as solutions for overhead conductors as network operators need to be able confidently to thermally rate their lines according to stable levels of solar reflectivity and thermal emissivity.

Thus, end users and network operators must plan according to an aged solar reflectance not the new or initial solar reflectance. It will be appreciated that significant and variable drops in solar reflectance are not practical from a network operators perspective who need to be able to thermally rate their overhead lines.

The dirt resistance of a distribution or power line could in theory be increased by using a coating having an additive such as colloidal silica ($SiO_2$). However, the use of such additives has been shown to result in up to a 20% reduction in the solar reflectance.

The surface of the conductor might also be washed with a high powered jet wash. However, a person skilled in the will understand this to be impractical from a commercial, safety and cost perspective especially when considering that the distribution or power line will be a high voltage overhead line.

The provision of a coating having a photocatalytic agent according to the present invention which provides a self-cleaning effect will immediately be recognised as being advantageous.

A particular advantage of incorporating a self-cleaning photocatalyst into the coating according to the present invention is the ability to provide a durable white coating which requires little or no maintenance overtime. According to various embodiments of the present invention the (white) coating will maintain a high degree of whiteness (i.e. $L^* \geq 80$) for a substantially longer period of time than conventional white coatings. According to an embodiment the coating may remain white having a $L^* \geq 80$ for an indefinite period of time when subjected to standard levels of airborne pollution.

According to various embodiments self-cleaning capabilities are preferably integrated into a white reflective monolayer.

Self-cleaning coatings may have a number of operating mechanisms. According to various embodiments the coating may be simultaneously: (i) anti-static thereby reducing the ability of particles to stick to the surface; (ii) super-hydrophilic thereby reducing the water contact angle of surface water thereby acting to collect and clear surface particulate matter on the surface more effectively in the presence of atmospheric water; and (iii) photocatalytic.

According to a particularly preferred embodiment anatase titanium dioxide ($TiO_2$) may be utilised as a photocatalytic agent. Anatase titanium dioxide ($TiO_2$) is a semi-conductor with a band gap of 3.2 eV, which when excited with UV light, creates hydroxyl ($OH^-$) and superoxide ($O_2^-$) radicals which preferably act to decompose surface organic matter accreted onto the coating into carbon dioxide ($CO_2$) and water ($H_2O$).

Single Inorganic Layer Formed from a Two-Part Kit

A self-cleaning white photonic coating according to an embodiment of the present invention may be formed by mixing together two parts of a kit.

The two part composition may comprise a first composition (part A) comprising: (i) a coating binder 50-70 wt % (of part A); (ii) optionally nanosilica ("nS") 2-5 wt % (of part A); (iii) optionally one or more optically active pigments e.g. rutile titanium dioxide ($TiO_2$) 10-20 wt % (of part A); (iv) a photocatalytic e.g. anatase titanium dioxide ($TiO_2$) 1.76%-2.75 wt % (of part A); (v) optionally inert fillers 10-20 wt % (of part A); and (vi) optionally zinc based co-curatives 0.4-1 wt % (of part A).

The two part composition preferably comprises a second composition (part B) comprising: (i) water 50-70 wt % (of part B); (ii) optionally a rheology modifier 0.3-1 wt % (of part B); (iii) optionally magnesium based co-curatives 10-15 wt % (of part B); (iv) optionally zinc based co-curative 1-3 wt % (of part B); and (v) optionally an aqueous emulsion 7-15 wt % (of part B).

Coating Binder

As the photocatalytic agent preferably performs a self-cleaning function by oxidising organic materials, organic binders are preferably not used for this purpose at least not to any significant degree. As such the binder preferably comprises an inorganic binder or a substantially inorganic binder.

According to a particularly preferred embodiment the binder may comprise an alkali or alkaline metal silicate binder and the binder may be water based. For example, the alkali (or alkaline) metal silicate preferably comprises potassium silicate ($K_2SiO_3$).

Alternatively, the alkali (or alkaline) metal silicate may comprise sodium silicate. The sodium silicate may comprise sodium metasilicate ($Na_2SiO_3$), sodium orthosilicate ($Na_4SiO_4$) or sodium pyrosilicate ($NaSi_2O_7$).

According to an embodiment the alkali (or alkaline) metal silicate may comprise lithium silicate ($Li_2SiO_3$).

According to another embodiment the alkali (or alkaline) metal silicate may comprise calcium silicate ($Ca_2SiO_4$) or calcium orthosilicate.

According to another embodiment the alkali (or alkaline) metal silicate may comprise magnesium aluminium silicate ($AlMgSiO_4$).

Nanosilica ("nS") or Colloidal Silica ($SiO_2$)

Nanosilica ("nS") or colloidal silica ($SiO_2$) may be added to increase the Si:alkali metal ratio and thereby increase the polymerisation of a coating according to a preferred embodiment. The resulting coating may comprise a siloxane polymer. The nanosilica ("nS") or colloidal silica ($SiO_2$) can increase the abrasion resistance and adhesion of the silicate to aluminium. Further, the addition of nanosilica ("nS") or colloidal silica ($SiO_2$) preferably further increases the inherent emissivity of the silicate binder further improving the cooling effect.

Siloxane (Silicone) Polymers

According to various embodiments of the present invention a single coating may be formed which may at least partially comprise a siloxane (silicone) polymer.

For reference purposes the chemical structure of several different siloxanes is shown below in Table 5:

TABLE 5

| Name | Hexamethylcyclo-trisiloxane (D3) | Octamethylcyclo-tetrasiloxane (D4) | Decamethylcyclo-pentasiloxane (D5) |
|---|---|---|---|
| Molecular formula | $C_6$—$H_{18}$—$O_3$—$Si_3$ | $C_8$—$H_{24}$—$O_4$—$Si_4$ | $C_{10}$—$H_{30}$—$O_5$—$Si_5$ |
| Structural formula | (structure of D3) | (structure of D4) | (structure of D5) |

TABLE 5-continued

| | | | |
|---|---|---|---|
| Molecular weight | 222.46 | 296.64 | 370.80 |
| CAS-no | 541-05-9 | 556-67-2 | 541-02-6 |
| Synonyms (among others) | Dimethylsiloxane cyclic trimer | Cyclic dimethylsiloxane tetramer, KF994 Part of Cyclomethicone | Cyclic dimethylsiloxane pentamer, KF995 Dow Corning 245 fluid. Part of Cyclomethicone |

| | | |
|---|---|---|
| Name | Dodecamethylcyclo-hexasiloxane (D6) | Hexamethyldisiloxane HMDS |
| Molecular formula | $C_{12}$—$H_{36}$—$O_6$—$Si_6$ | $C_6$—$H_{18}$—O—$Si_2$ |
| Structural formula | 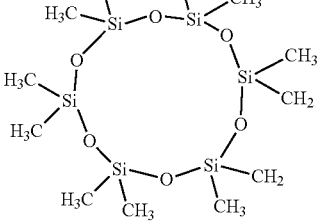 | 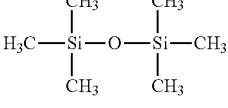 |
| Molecular weight | 444.93 | 162.42 |
| CAS-no | 540-97-6 | 107-46-0 |
| Synonyms (among others) | Cyclohexasiloxane | Oxybis(trimethyisilane), Bis(trimethylsilyl)ether |

Emulsion and/or Rheology Additive

In order to improve the rheological properties, flexibility and coating applicability an emulsion additive and/or rheology additive may optionally be added to the coating. According to an embodiment aqueous polydimethylsiloxane ("PDMS") (($C_2H_6OSi$)$_n$) of 40-50% solids may be used as an additive for the coating. Although polydimethylsiloxane ("PDMS") (($C_2H_6OSi$)$_n$) is organic, the main building block is siloxane based, which is not oxidised by the photocatalytic agents in the coating. In any case, the emulsion additive and/or rheology additive preferably comprises less than 5% of the dry film weight.

Photocatalytically Active Pigments

According to a particularly preferred embodiment a photocatalytic agent is preferably included in the conductor coating.

According to a preferred embodiment the photocatalytic agent may comprise 70 wt % anatase titanium dioxide ($TiO_2$) further preferably having an average particle size 100 nm.

The photocatalytic agent preferably results in the photocatalytic conversion of organic matter which may have adhered to the coating provided on the conductor. In particular, when anatase titanium dioxide ($TiO_2$) is excited by UV light it creates hydroxyl ($OH^-$) and superoxide ($O_2^-$) radicals which preferably decompose surface organic matter into carbon dioxide ($Co_2$) and water ($H_2O$).

According to an embodiment the photocatalytic agent may comprise a commercially available form of titanium dioxide ($TiO_2$) known either as DEGUSSA (EVONIK)® P25 or AEROXIDE® $TiO_2$ P25.

DEGUSSA (EVONIK)® P25 titanium dioxide ($TiO_2$) is a powdered form of titanium dioxide ($TiO_2$). The properties of P25 titanium dioxide ($TiO_2$) have been investigated in detail and reference is made to the Journal of Photochemistry and Photobiology A: Chemistry, 216(2-3): 179-182 which refers to the powdered form of titanium dioxide ($TiO_2$) as comprising a mixture of anatase, rutile and amorphous titanium dioxide ($TiO_2$) in the ratio anatase:rutile:amorphous 78:14:8.

It is noted that DEGUSSA (EVONIK)® P25 titanium dioxide ($TiO_2$) is often (incorrectly) reported as comprising 70:30, 80:20 or 85:15 anatase:rutile crystallites. Accordingly, the presence of the amorphous form of titanium dioxide ($TiO_2$) in DEGUSSA (EVONIK)® P25 titanium dioxide ($TiO_2$) seems often (incorrectly) to be ignored.

It has been reported that the average particle size ("aps") of the anatase titanium dioxide ($TiO_2$) in DEGUSSA (EVONIK)® P25 is approximately 85 nm and the average particle size ("aps") of rutile titanium dioxide ($TiO_2$) in DEGUSSA (EVONIK)® P25 is approximately 25 nm.

Titanium dioxide ($TiO_2$) may be used as a photocatalyst for decomposition of organic pollutants because it is chemically stable and biologically benign. The band gap of titanium dioxide ($TiO_2$) is larger than 3 eV (~3.0 for rutile and ~3.2 for anatase) thus making pure titanium dioxide ($TiO_2$) primarily active for UV light.

It is believed that the specific phase mixture of different polymorphs of titanium dioxide ($TiO_2$) as are present in DEGUSSA (EVONIK)® P25 has a synergistic effect and an increased photocatalytic activity is observed compared to pure phases (i.e. either relative to pure rutile titanium dioxide ($TiO_2$) or to pure anatase titanium dioxide ($TiO_2$)).

It is also generally accepted that pure anatase titanium dioxide ($TiO_2$) exhibits a higher photocatalytic activity than pure rutile titanium dioxide ($TiO_2$).

It is known that anatase titanium dioxide ($TiO_2$) has a larger band gap than rutile titanium dioxide ($TiO_2$). While this reduces the light that can be absorbed, it may raise the valence band maximum to higher energy levels relative to redox potentials of adsorbed molecules. Accordingly, the oxidation power of electrons may be increased and electron transfer may be facilitated from the titanium dioxide ($TiO_2$) to the adsorbed molecules.

Optically Active Pigments

Depending on the composition the coating may further comprise non-photocatalytic pigments. The pigments are preferably white in colour. According to a particularly preferred embodiment the coating may be arranged to have over 90% total solar reflectivity. This may be achieved in part by including optically active pigments in the coating which preferably promote solar reflectance without increasing absorption of visible light.

The optically active pigments may include rutile titanium dioxide ($TiO_2$).

According to other embodiments the optically active pigment may comprise silicon dioxide ($SiO_2$) or cerium hydroxide ($Ce(OH)_3$).

Fillers

An inorganic filler may be included for a number of purposes including pigment extension and increasing the thermal emissivity. The pigments preferably do not increase the absorption of solar radiation. According to various embodiments the filler may comprise calcium carbonate ($CaCO_3$), calcined kaolin ($Al_2O_3.2SiO_2$) or talc (e.g. hydrated magnesium silicate ($H_2Mg_3(SiO_3)_4$ or $Mg_3Si_4O_{10}(OH)_2$)).

According to another embodiment a filler with a high brightness such as sodium alumino silicate may be used to increase the total solar reflectivity.

Curing Agent—Co-Curative Metal Salts

According to various embodiments the coating may comprise a metal salt. In particular, polyvalent metal cations, such as $Zn^{2+}$, $Ca^{2+}$ and $Mg^{2+}$ can increase the viscosity of alkali metal silicate coatings (and siloxane coatings) and decrease the curing time. These can be added to make a two part solution. The solubility of the metal salt added determines the pot-life of the coating. For example, highly soluble metal salts such as magnesium sulphate ($MgSO_4$) will react readily with the alkali metal silicate coating (or siloxane coating) and reduce the pot-life substantially. Preferred salts include zinc oxide (ZnO), zinc stearate ($C_{36}H_{70}O_4Z_n$), trimagnesium orthophosphate ($Mg_3O_8P_2$), magnesium oxide (MgO) and magnesium carbonate ($MgCO_3$).

Reference to the "pot-life" of the coating is intended to be understood in the conventional sense of a two-pack or multi-component coating systems that cure through a chemical reaction. These systems generally consist of a base component (often called the "Part A") and a catalyst or hardener component (often called the "Part B"). When these components are mixed together a chemical reaction starts which will lead to the curing of the coating. In practical terms the term "pot-life" may be considered as the time from combining the components of the coating to the point at which the mixed coating is no longer useable. Pot-life is commonly thought of as the length of time that a mixed (catalysed) coating system retains a viscosity low enough to be applied to a surface (although this is not strictly true).

These materials can be combined to make a two part silicate coating with self-cleaning properties which adheres strongly to aluminium and provides sufficient flexibility required to be applied on conductors which are wrapped around cylindrical drums. The zinc based co-curative is important in both part A and part B to allow for rapid curing and the formation of insoluble films. The following section demonstrates how self-cleaning rates compare with dirt accretion on white surfaces.

Self-Cleaning Rates Versus Elemental Carbon Deposition

When black carbon (BC) is deposited upon a white surface, it will strongly absorb incident light, decrease solar reflectance and degrade aesthetic appearance. This increase in absorbance results in an increase in surface temperature meaning a reduction in cooling power of such a photonic coatings. In order to maintain cooling power in this scenario, black carbon will need to be removed.

Conductors according to various embodiments may become soiled by particulate matter (PM) such as soot which is an elemental carbon (EC). A simple and non-destructive method of measuring the amount of elemental carbon on a surface is by measuring it's whiteness (L*) relative to its clean state, wherein L*=0 is the darkest black and L*=100 is the brightest white.

It will be understood that by measuring L* it is possible to estimate how clean a surface is. It is also possible to predict the performance of a photocatalytic self-cleaning coating in various locations around the world and to assess its effectiveness as a method to maintain solar reflectivity.

Methodology

Two metrics will be compared in order to assess the effectiveness of a photocatalytic titanium dioxide ($TiO_2$) layer namely: (i) the amount of time taken for 8 µg $cm^{-2}$ of black carbon to accumulate on the coating surface; and (ii) the amount of time needed to clear 8 µg $cm^{-2}$ of black carbon from the surface.

The coating being analysed is a white silicate coating with concentration of photocatalytic fixed to 1.6 wt %.

The time taken for 8 µg $cm^{-2}$ of black carbon to accumulate on the surface depends on the average concentration of black carbon in the atmosphere and the deposition velocity of the particles.

The deposition velocity is governed by the particle's aerodynamic equivalent diameter ("aed"). Black carbon is an elemental carbon (EC) and is mainly hosted by $PM_{2.5}$.

$PM_{2.5}$ are a group of particles having an aerodynamic equivalent diameter ("aed") ≤2.5 µm and the corresponding deposition velocity for particles of this size is $1.89 \times 10^{-4}$ $ms^{-1}$.

The average concentration of black carbon in the atmosphere can change rapidly in a small area with concentrations peaking next to busy roads and industrial areas.

The concentration also varies widely with time of day, temperature and humidity. The data used below is taken as a yearly average and where possible on multiple sites around the city/country.

The black carbon concentration in Singapore, Delhi, London and Gent are found in the literature.

The other black carbon concentrations referred to below were estimated from $PM_{2.5}$ concentrations combined with data collected by the Surface PARTiculate mAtter Network ("SPARTAN").

SPARTAN collects data on the composition of $PM_{2.5}$ in different environments all over the world using a filter sampler (TEFLON® and NUCLEPORE®) and a nephelometer.

According to SPARTAN data the average fraction of black carbon in $PM_{2.5}$ was 11.9% (±8.2%). A deposition rate was established then scaled up to obtain a total time for 8 µg $cm^{-2}$ of black carbon to accumulate.

The concentration of black carbon in the atmosphere is strongly correlated to industry and density of automotive traffic rather than location, so a more generalised approach to this problem can be taken and the following estimates have been calculated: (i) rural 1.2-1.7 µg $m^{-3}$; (ii) small cities 2.4-3.0 µg $m^{-3}$; and (iii) large cities 4.6-7.9 µg $m^{-3}$.

For a fixed photocatalytic titanium dioxide ($TiO_2$) concentration, the time taken to clear 8 µg $cm^{-2}$ of black carbon is primarily dependant on the intensity of light incidence on the surface as this drives the photocatalytic process.

The intensity of light will vary from location to location. Accumulated total solar radiation on a horizontal surface per calendar year for each of the locations was sourced from the NASA POWER (Prediction of Worldwide Energy resources) project. This data was an average over the past 10 years where data allowed. In the case of countries, the accumulated total solar radiation figure was obtained by averaging the solar data for each major city in the country.

The accumulated solar radiation data was then used to calculate a surface recovery rate, which is an estimation of the rate at which the surface whiteness (L*) is recovered by the photocatalytic cleaning per day. This was done by multiplying the mean solar insolation at each location with a scalar, called the effective self-maintenance ("SM") factor. The self-maintenance ("SM") factor is a scalar that represents the total colour (L*) change by 8 µg cm$^{-2}$ of black carbon normalized by the corresponding total solar irradiation (i.e. the product of the solar intensity and irradiation duration) in the study environment. For 1.6 wt % photocatalytic titanium dioxide ($TiO_2$) with a black carbon loading of 8 µg cm$^{-2}$ the self-maintenance factor was found to be $1.9 \times 10^{-4}$ m$^2$h$^{-1}$ W$^{-1}$.

The surface recovery rate was then used to calculate the total number of days needed to fully recover the surface whiteness (L*) lost by a surface soiled by 8 µg cm$^{-2}$ of black carbon.

For 1.6 wt % titanium dioxide ($TiO_2$) the loss of L* was observed to be 11.2.

Results

TABLE 6

| Location | Deposition of 8 µg cm$^{-2}$ BC (days) | Surface recovery of 8 µg cm$^{-2}$ BC (days) |
|---|---|---|
| Singapore | 1814 | 15 |
| Delhi | 471 | 14 |
| *Dubai | 968 | 12 |
| *Saudi Arabia | 392 | 11 |
| *Beijing | 557 | 18 |
| London | 1339 | 25 |
| *Brazil | 2745 | 14 |
| *South Africa | 1328 | 12 |
| *Australia | 5881 | 12 |
| *China | 792 | 17 |
| Gent | 1376 | 24 |
| *UAE | 722 | 12 |

*Note: No empirical data for elemental carbon (EC) is available. Instead, it was estimated using a global percentage (11.9%) of $PM_{2.5}$ empirical data with the percentage coming from the Surface PARTiculate mAtter Network ("SPARTAN") project.

For the locations evaluated, the average surface recovery time is roughly 100 times faster than the deposition rate of 8 µg cm$^{-2}$ of black carbon.

Accordingly, 1.6 wt % photocatalytic titanium oxide ($TiO_2$) in silicate will act as a very effective self-cleaning layer for the standard conditions that the coatings are likely to face.

Non-Photocatalytic Example 1A

The following example relates to a base non-photocatalytic coating composition.

A two part water based inorganic photonic coating was manufactured comprising a first composition (part A) and a second composition (part B).

The first composition (part A) comprised: (i) potassium silicate (BETOLIN® K35, Wöllner GmbH, Ludwigshafen) 68.3 p.b.w.; (ii) rutile titanium dioxide ($TiO_2$) having an average particle size of 500 nm 20 p.b.w.; (iii) calcined kaolin ($Al_2O_3.2SiO_2$) 7.4 p.b.w.; (iv) talc (e.g. hydrated magnesium silicate ($H_2Mg_3(SiO_3)_4$ or $Mg_3Si_4O_{10}(OH)_2$)) 9.6 p.b.w.; (v) zinc stearate ($C_{36}H_{70}O_4Z_n$) 0.3 p.b.w.; and (vi) zinc oxide (ZnO) 0.2 p.b.w.

The second composition (part B) comprised: (i) water 56.7 p.b.w.; (ii) hydroxyethyl cellulose ($CH_2CH_2OH$) 0.6 p.b.w.; (iii) trimagnesium orthophosphate ($Mg_3O_8P_2$) 9.4 p.b.w.; (iv) magnesium carbonate ($MgCO_2$) 6 p.b.w.; and (v) zinc oxide (ZnO) 2.3 p.b.w.

It will be understood that "p.b.w." refers to "parts by weight" and can be used to indicate the relative proportion of components to be included in each composition.

The reagents were mixed in that order in two separate beakers. These were then mixed in a 1:1 ratio and mixed with a high speed mixer until uniform dispersal was achieved.

It is to be noted that this example is not photocatalytically active as no photocatalytically active nanoparticles were included in this formulation.

However, as a based formulation, the following tests were performed: (i) coating finish; (ii) mandrel bend test; and (iii) coating finish. The results are presented in Table 7 below.

Non-Photocatalytic Example 1B

The following example relates to a base non-photocatalytic coating composition.

A two part water based inorganic photonic coating was manufactured comprising a first composition (part A) and a second composition (part B).

The first composition (part A) comprised: (i) potassium silicate (BETOLIN® K35, Wöllner GmbH, Ludwigshafen) 68.3 p.b.w.; (ii) rutile titanium dioxide ($TiO_2$) having an average particle size of 500 nm 20 p.b.w.; (iii) calcined kaolin ($Al_2O_3.2SiO_2$) 7.4 p.b.w.; (iv) talc (e.g. hydrated magnesium silicate ($H_2Mg_3(SiO_3)_4$ or $Mg_3Si_4O_{10}(OH)_2$)) 9.6 p.b.w.; (v) zinc stearate ($C_{36}H_{70}O_4Z_n$) 0.3 p.b.w.; and (vi) zinc oxide (ZnO) 0.2 p.b.w.

The second composition (part B) comprised: (i) water 56.7 p.b.w.; (ii) hydroxyethyl cellulose ($CH_2CH_2OH$) 0.6 p.b.w.; (iii) trimagnesium orthophosphate ($Mg_3O_8P_2$) 9.4 p.b.w.; (iv) magnesium carbonate ($MgCO_2$) 6 p.b.w.; (v) zinc oxide (ZnO) 2.3 p.b.w.; and (vi) 40% solids acrylic latex emulsion additive 3.5 p.b.w.

The reagents were mixed in that order in two separate beakers. These were then mixed in a 1:1 ratio and mixed with a high speed mixer until uniform dispersal was achieved.

It is to be noted that this example is not photocatalytically active as no photocatalytically active nanoparticles were included in this formulation.

However, as a based formulation, the following tests were performed: (i) coating finish; (ii) mandrel bend test; and (iii) coating finish. The results are presented in Table 7 below.

Non-Photocatalytic Example 1C

The following example relates to a base non-photocatalytic coating composition.

A two part water based inorganic photonic coating was manufactured comprising a first composition (part A) and a second composition (part B).

The first composition (part A) comprised: (i) potassium silicate (BETOLIN® K35, Wöllner GmbH, Ludwigshafen) 68.3 p.b.w.; (ii) rutile titanium dioxide ($TiO_2$) having an average particle size of 500 nm 20 p.b.w.; (iii) calcined kaolin ($Al_2O_3 \cdot 2SiO_2$) 7.4 p.b.w.; (iv) talc (e.g. hydrated magnesium silicate ($H_2Mg_3(SiO_3)_4$ or $Mg_3Si_4O_{10}(OH)_2$)) 9.6 p.b.w.; (v) zinc stearate ($C_{36}H_{70}O_4Z_n$) 0.3 p.b.w.; (vi) zinc oxide (ZnO) 0.2 p.b.w.

The second composition (part B) comprised: (i) water 56.7 p.b.w.; (ii) hydroxyethyl cellulose ($CH_2CH_2OH$) 0.6 p.b.w.; (iii) trimagnesium orthophosphate ($Mg_3O_8P_2$) 9.4 p.b.w.; (iv) magnesium carbonate ($MgCO_2$) 6 p.b.w.; (v) zinc oxide (ZnO) 2.3 p.b.w.; and (vi) 40% solids acrylic latex emulsion additive 7.55 p.b.w.

The reagents were mixed in that order in two separate beakers. These were then mixed in a 1:1 ratio and mixed with a high speed mixer until uniform dispersal was achieved.

It is to be noted that this example is not photocatalytically active as no photocatalytically active nanoparticles were included in this formulation.

However, as a based formulation, the following tests were performed: (i) coating finish; (ii) mandrel bend test; and (iii) coating finish. The results are presented in Table 7 below.

Non-Photocatalytic Example 1D

The following example relates to a base non-photocatalytic coating composition.

A two part water based inorganic photonic coating was manufactured comprising a first composition (part A) and a second composition (part B).

The first composition (part A) comprised: (i) potassium silicate (BETOLIN® K35, Wöllner GmbH, Ludwigshafe) 68.3 p.b.w.; (ii) rutile titanium dioxide ($TiO_2$) having an average particle size of 500 nm 20 p.b.w.; (iii) calcined kaolin ($Al_2O_3 \cdot 2SiO_2$) 7.4 p.b.w.; (iv) talc (e.g. hydrated magnesium silicate ($H_2Mg_3(SiO_3)_4$ or $Mg_3Si_4O_{10}(OH)_2$)) 9.6 p.b.w.; (v) zinc stearate ($C_{36}H_{70}O_4Z_n$) 0.3 p.b.w.; and (vi) zinc oxide (ZnO) 0.2 p.b.w.

The second composition (part B) comprised: (i) water 56.7 p.b.w.; (ii) hydroxyethyl cellulose ($CH_2CH_2OH$) 0.6 p.b.w.; (iii) trimagnesium orthophosphate ($Mg_3O_8P_2$) 9.4 p.b.w.; (iv) magnesium carbonate ($MgCO_2$) 6 p.b.w.; (v) zinc oxide (ZnO) 2.3 p.b.w.; and (vi) 40% solids polydimethylsiloxane ("PDMS" ($C_2H_6OSi$)$_n$) latex emulsion additive 3.5 p.b.w.

The reagents were mixed in that order in two separate beakers. These were then mixed in a 1:1 ratio and mixed with a high speed mixer until uniform dispersal was achieved.

It is to be noted that this example is not photocatalytically active as no photocatalytically active nanoparticles were included in this formulation.

However, as a based formulation, the following tests were performed: (i) coating finish; (ii) mandrel bend test; and (iii) coating finish. The results are presented in Table 7 below.

Non-Photocatalytic Example 1E

The following example relates to a base non-photocatalytic coating composition.

A two part water based inorganic photonic coating was manufactured comprising a first composition (part A) and a second composition (part B).

The first composition (part A) comprised: (i) potassium silicate (BETOLIN® K35, Wöllner GmbH, Ludwigshafen) 68.3 p.b.w.; (ii) rutile titanium dioxide ($TiO_2$) having an average particle size of 500 nm 20 p.b.w.; (iii) calcined kaolin ($A_2O_3 \cdot 2SiO_2$) 7.4 p.b.w.; (iv) talc (e.g. hydrated magnesium silicate ($H_2Mg_3(SiO_3)_4$ or $Mg_3Si_4O_{10}(OH)_2$)) 9.6 p.b.w.; (v) zinc stearate ($C_{36}H_{70}O_4Z_n$) 0.3 p.b.w.; and (vi) zinc oxide 0.2 p.b.w.

The second composition (part B) comprised: (i) water 56.7 p.b.w.; (ii) hydroxyethyl cellulose ($CH_2CH_2OH$) 0.6 p.b.w.; (iii) trimagnesium orthophosphate ($Mg_3O_8P_2$) 9.4 p.b.w.; (iv) magnesium carbonate ($MgCO_2$) 6 p.b.w.; (v) zinc oxide (ZnO) 2.3 p.b.w.; and (vi) 40% solids polydimethylsiloxane ("PDMS" ($C_2H_6OSi$)$_n$) latex emulsion additive 7.55 p.b.w.

The reagents were mixed in that order in two separate beakers. These were then mixed in a 1:1 ratio and mixed with a high speed mixer until uniform dispersal was achieved.

It is to be noted that this example is not photocatalytically active as no photocatalytically active nanoparticles were included in this formulation.

However, as a based formulation, the following tests were performed: (i) coating finish; (ii) mandrel bend test; and (iii) coating finish. The results are presented in Table 7 below.

Results—Application/Applicability, Adhesion and Coating Finish/Flexibility

Examples 1A-1E detailed above were subjected to the following tests.

Mandrel Bend Test: The samples were bent round a 6 mm cylindrical mandrel. If the coating cracked and detached from the aluminium sample this was counted as a fail.

Cross Hatch Adhesion Test: The samples adhesion to aluminium was tested with a cross hatch adhesion test.

Coating Finish: The general usability of the coating was rated as "Fail", "Acceptable" or "Pass" according to the number of coating defects and ease of application of the coating.

TABLE 7

| Example | Application/applicability | Adhesion | Coating finish/flexibility |
|---|---|---|---|
| 1C | Pass | 4 A | Fail |
| 1B | Pass | 4 A | Fail |
| 1E | Poor | 4 A | Fail |
| 1D | Pass | 4 A | Pass |
| 1A | Pass | 4 A | Pass |

This demonstrates that whilst acrylic latex additives can improve the rheology and usability of the coating it generally vitiates the mechanical properties of the coating. PDMS (($C_2H_6OSi$)$_n$) emulsion additives should be minimised to below 5 wt % to ensure there is no significant effect on usability or flexibility.

Photocatalytic Coating Compositions

The previous section demonstrated it was feasible to get flexible coatings with high solar reflectance for aluminium. The following section outlines formulation variants to incorporate photocatalytic capabilities within the silicate layer in accordance with various embodiments of the present invention.

Inventive Example 2

A water based coating was prepared by mixing together two compositions.

The first composition (part A) comprised: (i) potassium silicate (BETOLIN® K35, Wöllner GmbH, Ludwigshafen) 26 p.b.w.; (ii) photocatalytic titanium dioxide ($TiO_2$) (DEGUSSA (EVONIK)® P25) 15 p.b.w.; (iii) colloidal silica ($SiO_2$) (LUDOX® SK, Grace GMBH and Co) 18 p.b.w.; (iv) calcium carbonate ($CaCO_3$) 5 μm 30 p.b.w.; (v) sodium aluminiosilicate ($AlNa_{12}SiO_5$) 1.5 p.b.w.; and (vi) stabiliser 1.5 p.b.w.

The second composition (Part B) comprised: (i) water 70.4 p.b.w.; (ii) hydroxyethyl cellulose ($CH_2CH_2OH$) 0.6 p.b.w.; (iii) magnesium carbonate ($MgCO_2$) 9.2 p.b.w.; (iv) magnesium oxide (MgO) 4.6 p.b.w.; and (v) zinc oxide (ZnO) 2 p.b.w.

The reagents or compositions were mixed in the order as listed above in two separate beakers. The contents of the two beakers were then mixed in a 1:1 ratio and mixed with a high speed mixer until uniform dispersal was achieved.

Inventive Example 3

A water based coating was prepared by mixing together two compositions.

The first composition (part A) comprised: (i) potassium silicate (BETOLIN® K35, Wöllner GmbH, Ludwigshafen) 26 p.b.w.; (ii) photocatalytic titanium dioxide ($TiO_2$) (DEGUSSA (EVONIK)® P25) 15 p.b.w.; (iii) colloidal silica ($SiO_2$) (LUDOX® SK, Grace GMBH and Co) 18 p.b.w.; (iv) calcined kaolin ($Al_2O_3.2SiO_2$) 12 p.b.w.; (v) talc (e.g. hydrated magnesium silicate ($H_2Mg_3(SiO_3)_4$ or $Mg_3Si_4O_{10}(OH)_2$)) 18 p.b.w.; (vi) sodium aluminiosilicate ($AlNa_{12}SiO_5$) 1.5 p.b.w.; and (vii) stabiliser 1.5 p.b.w.

The second composition (Part B) comprised: (i) water 70.4 p.b.w.; (ii) hydroxyethyl cellulose ($CH_2CH_2OH$) 0.6 p.b.w.; (iii) trimagnesium orthophosphate ($Mg_3O_8P_2$) 9.2 p.b.w.; (iv) magnesium carbonate ($MgCO_2$) 4.6 p.b.w.; and (v) zinc oxide (ZnO) 2 p.b.w.

The reagents or compositions were mixed in the order as listed above in two separate beakers. The contents of the two beakers were then mixed in a 1:1 ratio and mixed with a high speed mixer until uniform dispersal was achieved.

In Example 2 and Example 3, high solar reflectivity is achieved with relatively high volumes or wt % of titanium dioxide ($TiO_2$) (DEGUSSA (EVONIK)® P25) or equivalent and other high brightness materials including sodium aluminosilicate ($AlNa_2SiO_5$). These examples combine the coating properties of Example 1A with photocatalytic properties to provide a durable, self-cleaning coating for cooling overhead lines. Once the first coating or mixture is applied to an electrical conductor, the first coating or mixture is preferably dehydrated or dried. According to a preferred embodiment the conductor and applied coating is preferably thermally cured.

Examples have been given above of various two-part compositions. However, according to various further embodiments of the present invention the components necessary for providing the first coating 401 may be provided in a single composition which is formed or mixed and then sprayed or painted on to the conductor 400. Accordingly, although a two-part kit may be preferred it is not essential to provide the various components which form the single coating in a multi-part kit. Instead, all the components may be provided in a single mixture.

Water Based Alkali Metal Silicate Inorganic Coatings

According to the preferred embodiment the coating or mixture which is provided on the electrical conductor comprises an inorganic binder which preferably comprises a water based alkali metal silicate binder. Water based silicate coatings include a silicate anion stabilised by an alkali metal cation as shown in Eqn. 3 below:

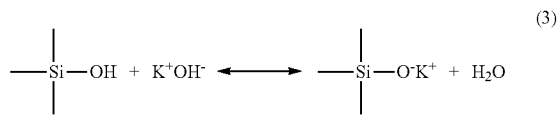

(3)

Eqn. 3 above illustrates equilibrium between undissociated silanol (Si—OH) groups and an alkali metal stabilised silicate anion (Si—O⁻).

According to various embodiments the alkali metal cation may comprise either sodium, potassium or lithium creating sodium silicate, potassium silicate or lithium silicate.

The above preferred water-based coatings may be cured by a condensation reaction whereby the silicate anions condense to form a siloxane chain and produce water as shown below:

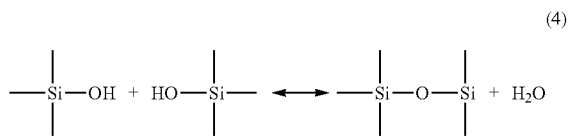

(4)

Eqn. 4 above shows equilibrium between two silanol groups and a siloxane bond, with water as a by-product.

The full removal of water is desirable for the silicate polymer to form completely i.e. the equilibrium needs to be driven completely to the right. Without the full removal of water, the film might resolubilise and the coating might degrade.

The coatings according to various embodiments of the present invention may be self-cured through the addition of divalent metal cations and/or may be post-cured with dilute phosphoric acid. According to various embodiments dried films may be assisted by the addition of divalent metal cations such as $Mg^{2+}$ and $Ca^{2+}$. The resultant coatings according to various embodiments are moisture stable at ambient temperatures.

According to various embodiments the alkali metal silicate film or coating may be cured. According to an embodiment the coating may be subjected to a stepwise thermal curing process over a period of several hours. The thermal curing process may according to various embodiments be for a period of 4-24 hours. According to various embodiments, the alkali metal silicate film or coating may be thermally cured for a period of <1 hour, 1-2 hours, 2-3 hours, 3-4 hours, 4-5 hours, 5-6 hours, 6-7 hours, 7-8 hours, 8-9 hours, 9-10 hours, 10-11 hours, 11-12 hours, 12-13 hours, 13-14 hours, 14-15 hours, 15-16 hours, 16-17 hours, 17-18 hours, 18-19 hours, 19-20 hours, 20-21 hours, 21-22 hours, 22-23 hours, 23-24 hours or >24 hours.

According to various embodiments the thermal curing process may be arranged to dehydrate the silicate film or inorganic coating which includes a self-cleaning photocatalytic agent.

According to various embodiments the thermal curing process may comprise a stepwise curing process in order to incrementally dehydrate the film and cause the first coating or mixture to solidify or otherwise harden.

According to various embodiments the final curing temperature may in the range 50-80° C. For example, the final curing temperature may be in the range 50-60° C., 60-70° C. or 70-80° C. In particular, if the coating is applied to a conductor which has a maximum operating temperature of 80° C. then the final curing temperature may be arranged to be s 80° C., s 90° C. or s 100° C.

According to other embodiments the final curing temperature may in the range 150-250° C. For example, the final curing temperature may be in the range 150-160° C., 160-170° C., 170-180° C., 180-190° C., 190-200° C., 200-210° C., 210-220° C., 220-230° C., 230-240° C. or 240-250° C. In particular, if the coating is applied to a conductor which has a maximum operating temperature of 250° C. then the final curing temperature may be arranged to be ≤250° C., ≤260° C., ≤270° C., ≤280° C., ≤290° C. or ≤300° C.

The silicate coating which is applied to conductors according to various embodiments may have a long lifetime due to their purely inorganic nature, which makes degradation by UV and general atmospheric exposure very limited.

The silicate inorganic coating including a photocatalytic agent is also particularly effective as a self-cleaning layer which maintains the substantially white coating to a high level of whiteness for an extended period of time.

Inventive Example 4

A particularly preferred water based coating was prepared by mixing together two compositions. The first composition (part A) comprised: (i) potassium silicate (BETOLIN® 20 K35, Wollner GmbH, Ludwigshafen) 64 p.b.w.; (ii) rutile titanium dioxide (500 nm APS) 8 p.b.w.; (iii) photocatalytic titanium dioxide ($TiO_2$) (DEGUSSA (EVONIK)® P25) 3.2 p.b.w.; (iv) calcined kaolin (Mattex Pro BSF) 1.88 p.b.w.; (v) sodium aluminiosilicate ($AlNa_{12}SiO_5$) 1.5 p.b.w.; and (vi) a stabiliser 1.5 p.b.w.

The second composition (Part B) comprised: (i) water 15 p.b.w.; (ii) 25 hydroxyethyl cellulose ($CH_2CH_2OH$) 0.6 p.b.w.; (iii) trimagensium orthophosphate (4.5 p.b.w) and (iv) zinc oxide (ZnO) 2 p.b.w.

The reagents or compositions were mixed in the order as listed above in two separate beakers. The contents of the two beakers were then mixed in a 1:1 ratio and mixed with a high speed mixer until uniform dispersal was achieved.

Tests Performed on Inventive Example 4

The following tests were performed on Inventive Example 4.

Coating Finish: The general usability of the coating was rated as "Fail", "Acceptable" or "Pass" according to the number of coating defects and ease of application of the coating.

Cross Hatch Adhesion Test: The sample's adhesion to aluminium was tested with a cross hatch adhesion test.

Mandrel Bend Test: The sample was bent round a 6 mm cylindrical mandrel. If the coating cracked and detached from the aluminium sample then this was counted as a fail.

Solar Reflectivity: UV-VIS-NIR analysis was carried out using a Jasco V670 UVVIS-NIR spectrometer with ISN-723 integrating sphere attachment. An integrating sphere attachment allowed collection of diffuse radiation (about 180°) reflected by the sample. The total solar reflectance was calculated.

Thermal Emissivity: In accordance with ASTM C 1371-15 Standard Test Method for Determination of Emittance of Materials Near Room Temperature Using Portable Emissometers. Emissivity was measured using a D & S emissometer without traceability to reference standards as described in Clause 6.1.5 of the standard. The results are for five different positions of the sample surface which have then been averaged.

Current Cycling: A circuit was set up with a coated and uncoated conductor connected in series. The conductor comprised an Aluminium Conductor Steel Reinforced ("ACSR") conductor. Thermocouples were inserted into the conductor core. A specified level of current was transmitted through the conductor for 30 minutes which had the effect of increasing the temperature of the conductor. The conductor was then allowed to cool for 30 minutes. The process was then repeated and cycled. This test demonstrates a compatible coefficient of thermal expansion between the coating and the aluminium conductor.

Outdoor Cooling Performance: An uncoated and coated Aluminium Conductor Steel Reinforced ("ACSR") conductor were connected in series and were suspended two metres above the ground with full exposure to meteorological conditions. The conductors were subjected to 200 A current and the resulting temperatures were recorded every second for a week by thermocouples which were inserted into the conductor cores. This test demonstrated real world cooling performance of coated conductors compared with uncoated conductors in the United Kingdom during the month of May.

Results of Testing Inventive Example 4

The results of testing Inventive Example 4 are summarised below:

| Coating Finish | Pass |
| Crosshatch adhesion | 5 B |
| Mandrel Bend Test | Pass |
| Solar Reflectance | 0.903 |
| Thermal Emissivity | 0.93 |

Figure 12:
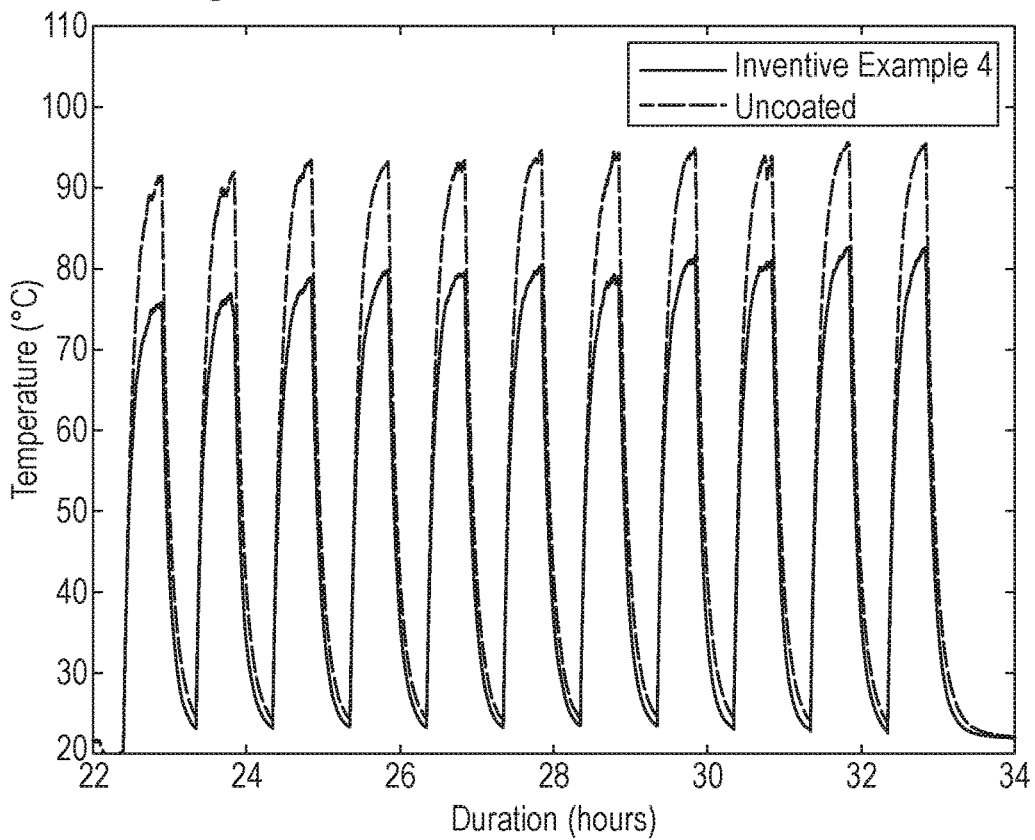
FIG. 12 shows the results of a current cycling test and shows that a preferred coated conductor according to an embodiment of the present invention was particularly effective in reducing the temperature of an Aluminium Conductor Steel Reinforced ("ACSR") conductor.

FIG. 12 shows the results of the current cycling test and shows that Inventive Example 4 was particularly effective in reducing the temperature of the Aluminium Conductor Steel Reinforced ("ACSR") conductor.

Figure 13:
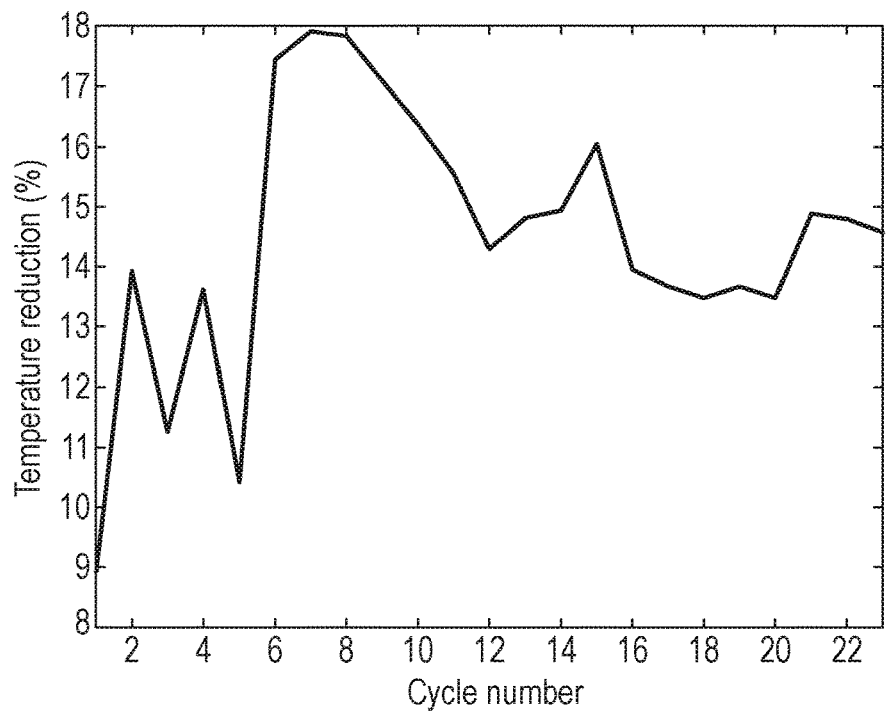
FIG. 13 shows the results of a current cycling test performed on a preferred coated conductor according to an embodiment of the present invention in terms of the temperature reduction (%) per cycle.

FIG. 13 shows the results of the current cycling test performed on Inventive Example 4 in terms of the temperature reduction (%) per cycle.

Figure 14:
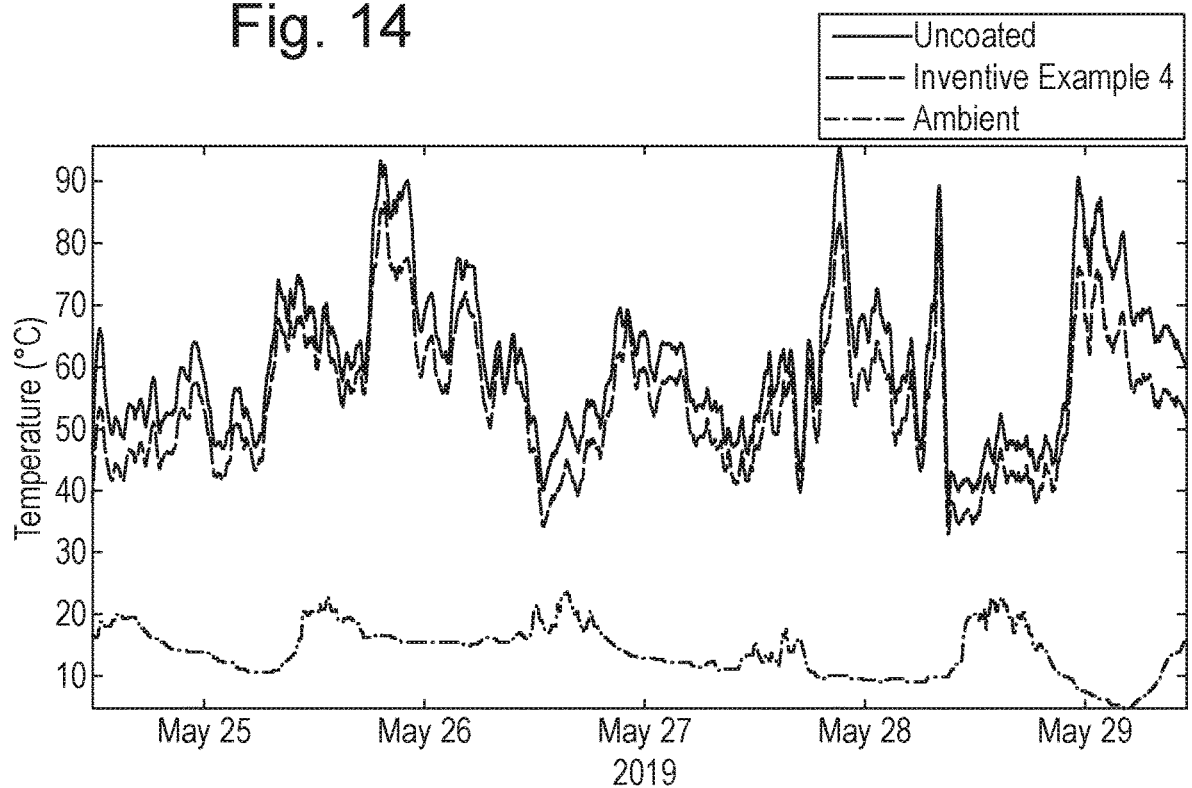
FIG. 14 shows the results of an outdoor cooling performance test performed on a preferred coated conductor according to an embodiment of the present invention.

FIG. 14 shows the results of the outdoor cooling performance test performed on Inventive Example 4.

Figure 15:
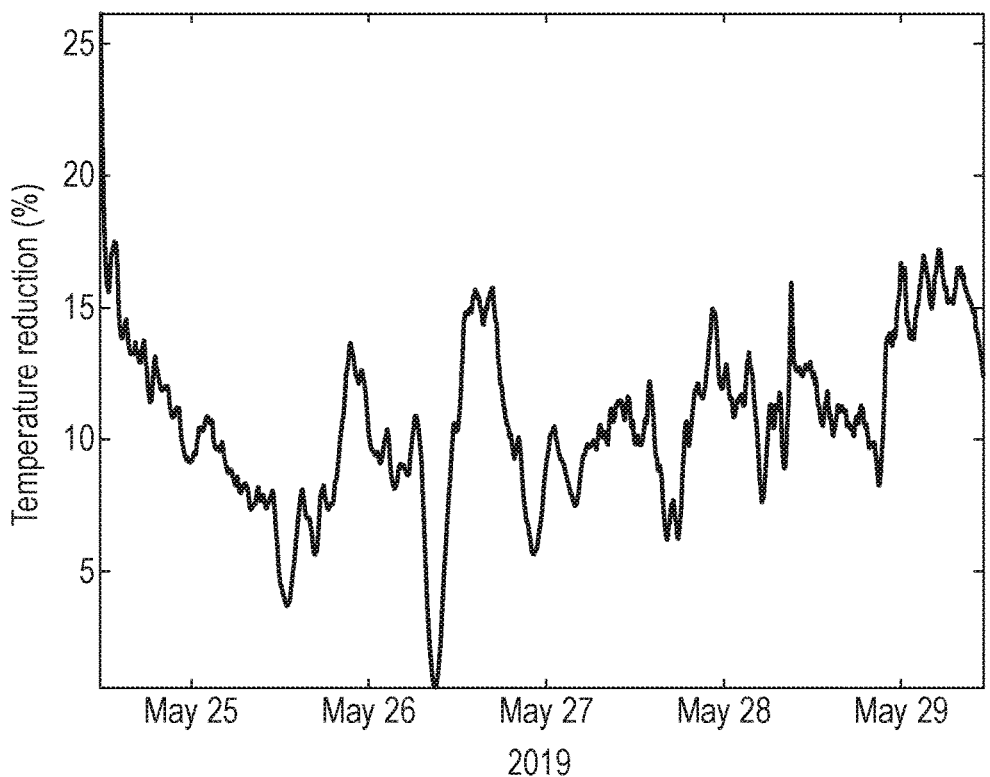
FIG. 15 shows the temperature reduction (%) difference between a preferred coated conductor according to an embodiment of the present invention and an uncoated conductor during a week in the month of May in the United Kingdom.

FIG. 15 shows the temperature reduction (%) difference between Inventive Example 4 and an uncoated conductor during a week in the month of May in the United Kingdom.

The above results and testing illustrate that Inventive Example 4 comprises a particularly beneficial composition which, in use, forms a first coating on a conductor which is particularly effective in reducing the temperature of the conductor as well as having beneficial self-cleaning properties.

Although the present invention has been described with reference to preferred embodiments, it will be understood by those skilled in the art that various changes in form and detail may be made without departing from the scope of the invention as set forth in the accompanying claims.

The invention claimed is:

1. A single coated conductor for an overhead power transmission or distribution line comprising:
   one or more electrical conductors; and
   a first coating provided on at least a portion of the one or more electrical conductors, wherein the first coating comprises:
   (i) an inorganic binder comprising an alkali metal silicate;
   (ii) a polymerisation agent comprising nanosilica ("nS") or colloidal silica ($SiO_2$); and
   (iii) a photocatalytic agent, wherein the photocatalytic agent comprises ≥70 wt % anatase titanium dioxide ($TiO_2$) having an average particle size ("aps") ≤100 nm;
   wherein the first coating has an average thermal emissivity coefficient E≥0.90 across the infrared spectrum 2.5-30.0 µm and has an average solar reflectivity coefficient R≥0.90 and/or an average solar absorptivity coefficient A≤0.10 across the solar spectrum 0.3-2.5 µm.

2. A single coated conductor as claimed in claim 1, wherein the alkali metal silicate comprises potassium silicate ($K_2SiO_3$), sodium silicate, or lithium silicate ($Li_2SiO_3$).

3. A single coated conductor as claimed in claim 2, wherein the sodium silicate comprises sodium metasilicate ($Na_2SiO_3$), sodium orthosilicate ($Na_4SiO_4$) or sodium pyrosilicate ($Na_6Si_2O_7$).

4. A single coated conductor as claimed in claim 1, wherein the alkali metal silicate comprises a water based coating which is dehydrated, dried or cured after the first coating is provided on at least a portion of the one or more electrical conductors.

5. A single coated conductor as claimed in claim 1, wherein the photocatalytic agent comprises ≥75 wt % anatase titanium dioxide ($TiO_2$).

6. A single coated conductor as claimed in claim 1, further comprising a reflective agent comprising rutile titanium dioxide.

7. A single coated conductor as claimed in claim 6, wherein the rutile titanium dioxide ($TiO_2$) has an average particle size ("aps") ≥100 nm.

8. A single coated conductor as claimed in claim 6, wherein the rutile titanium dioxide ($TiO_2$) comprises substantially spherical particles.

9. A single coated conductor as claimed in claim 6, wherein the reflective agent comprises sodium aluminosilicate ($AlNa_12SiO_5$).

10. A single coated conductor as claimed in claim 6, wherein the reflective agent comprises a white filler which comprises: (i) magnesium oxide (MgO); (ii) calcium oxide (CaO); (iii) aluminum oxide ($Al_2O_3$); (iv) zinc oxide (ZnO); (v) calcium carbonate ($CaCO_3$); (vi) aluminum silicate ($Al_2SiO_5$); (vii) kaolin ($Al_2O_3.2SiO_2$); (viii) titanium dioxide ($TiO_2$); or (viii) barium sulphate ($BaSO_4$).

11. A single coated conductor as claimed in claim 1, further comprising an emissive agent which comprises an inorganic filler.

12. A single coated conductor as claimed in claim 11, wherein the inorganic filler comprises either: (i) calcium carbonate ($CaCO_3$); (ii) calcined kaolin ($Al_2O_3.2SiO_2$); or (iii) talc (hydrated magnesium silicate ($H_2Mg_3(SiO_3)_4$ or $Mg_3Si_4O_{10}(OH)_2$)).

13. A single coated conductor as claimed in claim 1, further comprising a curing agent selected from: (i) zinc oxide (ZnO); (ii) zinc stearate ($C_{36}H_{70}O_4Zn$); (iii) trimagnesium orthophosphate ($Mg_3O_8P_2$); (iv) magnesium oxide (MgO); (v) magnesium carbonate ($MgCO_3$); and (vi) magnesium hydroxide ($Mg(OH)_2$).

14. A single coated conductor as claimed in claim 1, further comprising an emulsion agent and/or a rheology agent selected from (i) hydroxyethyl cellulose; and (ii) polydimethylsiloxane.

15. A single coated conductor as claimed in claim 1, wherein the first coating is substantially white in colour has a L*≥80.

16. A single coated conductor as claimed in claim 1, wherein the first coating has an average thermal emissivity coefficient E≥0.90 across the infrared spectrum 2.5-30.0 µm when tested in accordance with ASTM E408 (2013) and/or an average solar reflectivity coefficient R≥0.90 and/or an average solar absorptivity coefficient A≤0.10 across the solar spectrum 0.3-2.5 µm when tested in accordance with ASTM E903 (2012).

17. A single coated conductor as claimed in claim 1, wherein the single coated conductor when tested in accordance with ANSI C19.4-2004 operates at a lower temperature than the temperature of the same one or more electrical conductors without the first coating.

18. A single coated conductor as claimed in claim 1, wherein the first coating has a thickness in the range >1 micron.

19. A kit for coating one or more electrical conductors to form a single coated conductor for an overhead power transmission or distribution line, the kit comprising:
   a first part comprising: (i) an inorganic binder comprising an alkali metal silicate; (ii) a polymerisation agent comprising nanosilica ("nS") or colloidal silica ($SiO_2$); and (iii) a photocatalytic agent, wherein the photocatalytic agent comprises ≥70 wt % anatase titanium dioxide ($TiO_2$) having an average particle size ("aps") ≤100 nm; and
   a second part comprising: (i) a curing agent;
   wherein, in use, the first and second parts are mixed together to form a first mixture and the first mixture is then sprayed, painted, coated or applied on to at least a portion of one or more electric conductors to form a first coating, wherein the first coating has an average thermal emissivity coefficient E≥0.90 across the infrared spectrum 2.5-30.0 µm and an average solar reflectivity coefficient R≥0.90 and/or an average solar absorptivity coefficient A≤0.10 across the solar spectrum 0.3-2.5 µm.

20. A kit as claimed in claim 19, wherein the inorganic binder comprises a water based inorganic binder.

21. A method of coating one or more electrical conductors to form a single coated conductor for an overhead power transmission or distribution line comprising:
   spraying, painting, coating or applying a first coating on to at least a portion of one or more electrical conductors, wherein the first coating comprises:
   (i) an inorganic binder comprising an alkali metal silicate;
   (ii) a polymerisation agent comprising nanosilica ("nS") or colloidal silica ($SiO_2$); and
   (iii) a photocatalytic agent, wherein the photocatalytic agent comprises ≥70 wt % anatase titanium dioxide ($TiO_2$) having an average particle size ("aps") ≤100 nm;
   wherein the first coating has an average thermal emissivity coefficient E≥0.90 across the infrared spectrum 2.5-30.0 µm and has an average solar reflectivity coefficient $R \geq 0.90$ and/or an average solar absorptivity coefficient $A \leq 0.10$ across the solar spectrum 0.3-2.5 µm.

22. A method as claimed in claim 21, wherein the inorganic binder comprises a water based inorganic binder and the method further comprises dehydrating, drying or curing the inorganic binder.

23. A method as claimed in claim 21, further comprising thermally curing the first coating.

\* \* \* \* \*